United States Patent
Cho et al.

(10) Patent No.: US 8,934,541 B2
(45) Date of Patent: Jan. 13, 2015

(54) METHOD, MEDIUM, AND APPARATUS ENCODING AND/OR DECODING AN IMAGE USING THE SAME CODING MODE ACROSS COMPONENTS

(75) Inventors: Dae-sung Cho, Yongin-si (KR); Hyun-mun Kim, Yongin-si (KR); Woo-shik Kim, Yongin-si (KR); Dmitri Birinov, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1648 days.

(21) Appl. No.: 11/598,681

(22) Filed: Nov. 14, 2006

(65) Prior Publication Data

US 2007/0110153 A1     May 17, 2007

Related U.S. Application Data

(60) Provisional application No. 60/735,814, filed on Nov. 14, 2005.

(30) Foreign Application Priority Data

May 30, 2006  (KR) .................. 10-2006-0049079
Nov. 8, 2006  (KR) .................. 10-2006-0110225

(51) Int. Cl.
*H04N 7/12* (2006.01)
*H04N 19/186* (2014.01)
(Continued)

(52) U.S. Cl.
CPC ... *H04N 19/00315* (2013.01); *H04N 19/00551* (2013.01); *H04N 19/00369* (2013.01); *H04N 19/00127* (2013.01); *H04N 19/00296* (2013.01); *H04N 19/00351* (2013.01);
(Continued)

(58) Field of Classification Search
USPC ........................................ 375/240.01, 240.13
IPC ......................................................... H04N 7/12
See application file for complete search history.

(56) References Cited

U.S. PATENT DOCUMENTS 5,122,873 A    6/1992  Golin
6,204,780 B1 *  3/2001  Cole .............................. 341/50
(Continued)

FOREIGN PATENT DOCUMENTS

EP    1 507 415    2/2005
EP    1 509 045    2/2005
(Continued)

OTHER PUBLICATIONS

Yung-Lyul Lee et al., "Lossless Intra Coding for Improved 4:4:4 Coding in H.264/MPEG-4 AVC" 2, Joint Video Team (JVT) of ISO/IEC MPEG & ITU-T VCEG (ISO/IEC JTC1/SC29/WG11 and ITU-T SG16 Q.6), JVT-P016, Jul. 24, 2005, pp. 2-3.
(Continued)

*Primary Examiner* — Dave Czekaj
*Assistant Examiner* — Tracy Li
(74) *Attorney, Agent, or Firm* — Staas & Halsey LLP

(57) ABSTRACT

A method, medium, and apparatus encoding and/or decoding an image in order to increase encoding and decoding efficiency by performing binary-arithmetic coding/decoding on a binary value of a syntax element using a probability model having the same syntax element probability value for respective context index information of each of at least two image components.

2 Claims, 26 Drawing Sheets

(51) Int. Cl.
| | | |
|---|---|---|
| H04N 19/463 | (2014.01) | |
| H04N 19/196 | (2014.01) | |
| H04N 19/132 | (2014.01) | |
| H04N 19/18 | (2014.01) | |
| H04N 19/19 | (2014.01) | |
| H04N 19/70 | (2014.01) | |
| H04N 19/176 | (2014.01) | |
| H04N 19/147 | (2014.01) | |
| H04N 19/61 | (2014.01) | |
| H04N 19/109 | (2014.01) | |
| H04N 19/11 | (2014.01) | |
| H04N 19/593 | (2014.01) | |
| H04N 19/182 | (2014.01) | |
| H04N 19/46 | (2014.01) | |
| H04N 19/91 | (2014.01) | |

(52) U.S. Cl.
CPC .. *H04N 19/00884* (2013.01); *H04N 19/00278* (2013.01); *H04N 19/00175* (2013.01); *H04N 19/00781* (2013.01); *H04N 19/00036* (2013.01); *H04N 19/00042* (2013.01); *H04N 19/00763* (2013.01); *H04N 19/00303* (2013.01); *H04N 19/00545* (2013.01); *H04N 19/00951* (2013.01)
USPC .................................................. 375/240.12

(56) References Cited

U.S. PATENT DOCUMENTS

| | | | |
|---|---|---|---|
| 6,728,317 | B1 | 4/2004 | Demos |
| 6,856,701 | B2 | 2/2005 | Karczewicz et al. |
| 7,333,544 | B2 | 2/2008 | Kim et al. |
| 7,469,069 | B2 | 12/2008 | Kim et al. |
| 7,646,815 | B2 * | 1/2010 | Dattani et al. ........... 375/240.24 |
| 7,751,476 | B2 | 7/2010 | Tanizawa et al. |
| 8,019,001 | B2 | 9/2011 | Kim et al. |
| 8,036,478 | B2 | 10/2011 | Kim et al. |
| 2005/0053132 | A1* | 3/2005 | Caball et al. ............. 375/240.11 |
| 2005/0069211 | A1 | 3/2005 | Lee et al. |
| 2005/0152452 | A1* | 7/2005 | Suzuki ..................... 375/240.16 |
| 2005/0157797 | A1* | 7/2005 | Gaedke .................... 375/240.24 |
| 2006/0222080 | A1* | 10/2006 | Wang ....................... 375/240.24 |

FOREIGN PATENT DOCUMENTS

| | | |
|---|---|---|
| JP | 2001-054138 | 2/2001 |
| JP | 2001-095012 | 4/2001 |
| JP | 2003-163945 | 6/2003 |
| JP | 2004-222027 | 8/2004 |
| JP | 2005-039743 | 2/2005 |
| JP | 2005-191706 | 7/2005 |
| KR | 10-2004-0099086 | 11/2004 |
| KR | 10-2005-0009216 | 1/2005 |
| KR | 10-2005-0050540 | 5/2005 |
| KR | 10-2006-0095821 | 9/2006 |
| WO | 2007/055552 | 5/2007 |

OTHER PUBLICATIONS

Thomas Wedi et al., Intra Only 4:4:4 Coding for H.264/AVC FRExt, Joint Video Team (JVT) of ISO/IEC MPEG & ITU-T VCEG (ISO/IEC JTC1/SC29/WG11 and ITU-T SG16 Q.6), JVT-P088, Jul. 24, 2005, pp. 1-2.

Woo-Shik Kim et al., "Study on Advanced 4:4:4 Coding", IEEE Transactions on Circuits and Systems for Video for Video Technology, IEEE Service Center, Piscataway, NJ LNKD-DOI 10.1109/TCSVT.20030815165, vol. 13, No. 7, Jul. 1, 2003 pp. 560-576, XP011221093.

European Search Report dated Feb. 4, 2011, corresponds to European Patent Application No. 10188440.1-2223.

European Search Report dated Feb. 4, 2011, corresponds to European Patent Application No. 10188441.9-2223.

Japanese Office Action dated Jan. 11, 2011, corresponds to Japanese Patent Application No. 2008-539940.

PCT International Search Report issued Feb. 26, 2007 in corresponding International Patent Application No. PCT/KR2006/004783.

Yu H. et al: "Advanced 4:4:4 profile", ITU Study Group 16—Video Coding Experts Group—ISO/IEC MPEG & ITU-T VCEG (ISO/IEC JTC1/SC29/WG11 and ITU-T SG16 Q6), No. JVT-P017rI, Oct. 15, 2005.

Wiegand T. et al., "Overview of the H.264/AVC video coding standard", IEEE Transactions on Circuits and Systems for Video Technology, IEEE Service Center, Piscataway, NJ, US LNKD-DOI:10.1109/TCSVT.2003.815165. vol. 13, No. 7, Jul. 1, 2003, pp. 560-576.

Extended European Search report mailed Dec. 1, 2010, corresponds to European Patent Application No. 06812606.9-2223.

Haoping Yu et al., "Advanced 4:4:4 Profile for MPEG4—Part 10/H.264," Joint Video Team (JVT) of ISO/IEC MPEG & ITU-T VCEG (ISO/IED JTC1/SC29/WG11 and ITU-TSG16 Q.6), JVT-P017r1, Joint Video Team (JVT) of ISO-IEC MPEG & ITU-TVCEG, Jul. 24, 2005, p. 2, 4-6.

Woo-Shik Kim, "Color Format Extension", 8$^{th}$ JVT Meeting; May 23, 2003-May 27, 2003; Geneva, CH; (Joint Video Team of ISO/IEC JTC1/SC29/WG11 and ITU-T SG.16), No. JVT-H018, May 27, 2003, XP030005722. ISSN: 0000-0426.

European Communication Pursuant to Article 94(3) EPC dated Dec. 12, 2011 Corresponds to European Application No. 10 188 440.1-2223.

European Communication Pursuant to Article 94(3) EPC dated Dec. 12, 2011 Corresponds to European Application No. 10 188 441.9-2223.

Japanese Non-Final Office Action dated Oct. 18, 2011 corresponds to Japanese Patent Application No. 2008-539940.

Korean Notice of Allowance dated Oct. 13, 2008 corresponds to Korean Patent Application No. 10-2006-0110225.

Japanese Office Action mailed Jan. 22, 2013 in corresponding Japanese Patent Application No. 2011-087682.

Haoping Yu et al., "Advanced 4:4:4 profile for MPEG4—Part10/H.264", Joint Video Team (JVT) of ISO/IEC & ITU-T VCEG, Jul. 2005, pp. 1-22.

Thomas Wedi et al., "Intra only 4:4:4 coding for H.264/AVC FRExt", Joint Video Team (JVT) of ISO/IEC & ITU-T VCEG, Jul. 2005, pp. 1-11.

Japanese Final Rejection mailed Feb. 28, 2012, corresponds to Japanese Patent Application No. 2008-539940.

Thomas Wiegand et al., "Draft ITU-T Recommendation and Final Draft International Standard of Joint Video Specification (ITU-T Rec. H. 264, ISO/IEC 14496-10 AVC)", Joint Video Team (JVT) of ISO/IEC MPEG and ITU-T VCEG, Pattaya, Thailand, Mar. 7-14, 2003.

Japanese Office Action for related Japanese Patent Application No. 2008-539940, mailed on Nov. 6, 2012.

European Search Report for European Application No. 10 188 440.1, mailed Jun. 12, 2012.

European Search Report for European Application No. 06 812 606.9, mailed Jun. 18, 2012.

Abstract of "Information technology—Business Operation View—Part 10: IT-enabled coded domains as semantic components in business transactions", ISO/IEC 15944-10:2013, 2 pages.

Summons to attend oral proceeding dated Jul. 11, 2013 in European Patent Application 10188441.9.

Summons to attend oral proceeding dated Jul. 16, 2013 in European Patent Application 10188440.1.

Summons to attend oral proceeding dated Jul. 16, 2013 in European Patent Application 06812606.9.

Decision to Refuse, issued Dec. 17, 2013 in European Patent Application 10188440.1.

Decision to Refuse, issued Dec. 20, 2013 in European Patent Application 10188441.9.

Decision to Refuse, issued Dec. 20, 2013 in European Patent Application 06812606.9.

* cited by examiner

FIG. 8A
FIG. 8B
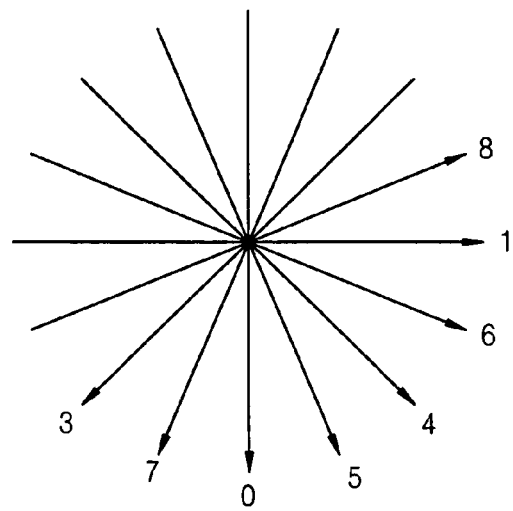
FIG. 9
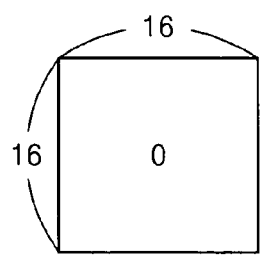 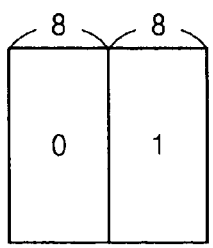 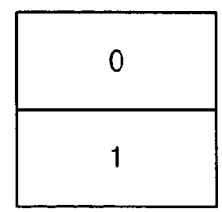 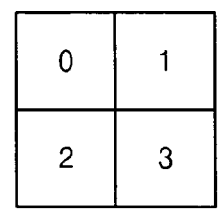
MACRO BLOCK PARTITIONS : 16x16, 16x8, 8x16, 8x8
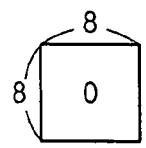 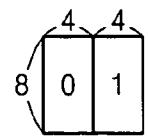 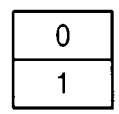 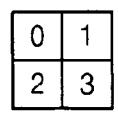
8x8 BLOCK PARTITIONS : 8x8, 8x4, 4x8, 4x4

| abs_level_minus1 | Bin string | | | | | | | | | | | | | | | | | | |
|---|---|---|---|---|---|---|---|---|---|---|---|---|---|---|---|---|---|---|---|
| | TU prefix | | | | | | | | | | | | | | EGO suffix | | | | |
| 0 | 0 | | | | | | | | | | | | | | | | | | |
| 1 | 1 | 0 | | | | | | | | | | | | | | | | | |
| 2 | 1 | 1 | 0 | | | | | | | | | | | | | | | | |
| 3 | 1 | 1 | 1 | 0 | | | | | | | | | | | | | | | |
| ... | | | | | | | | | | | | | | | | | | | |
| 9 | 1 | 1 | 1 | 1 | 1 | 1 | 1 | 1 | 1 | 0 | | | | | | | | | |
| 10 | 1 | 1 | 1 | 1 | 1 | 1 | 1 | 1 | 1 | 1 | 0 | | | | | | | | |
| 11 | 1 | 1 | 1 | 1 | 1 | 1 | 1 | 1 | 1 | 1 | 1 | 0 | | | | | | | |
| 12 | 1 | 1 | 1 | 1 | 1 | 1 | 1 | 1 | 1 | 1 | 1 | 1 | 0 | | | | | | |
| 13 | 1 | 1 | 1 | 1 | 1 | 1 | 1 | 1 | 1 | 1 | 1 | 1 | 1 | 0 | | | | | |
| 14 | 1 | 1 | 1 | 1 | 1 | 1 | 1 | 1 | 1 | 1 | 1 | 1 | 1 | 1 | 0 | | | | |
| 15 | 1 | 1 | 1 | 1 | 1 | 1 | 1 | 1 | 1 | 1 | 1 | 1 | 1 | 1 | 1 | 0 | 0 | | |
| 16 | 1 | 1 | 1 | 1 | 1 | 1 | 1 | 1 | 1 | 1 | 1 | 1 | 1 | 1 | 1 | 0 | 1 | | |
| 17 | 1 | 1 | 1 | 1 | 1 | 1 | 1 | 1 | 1 | 1 | 1 | 1 | 1 | 1 | 1 | 1 | 0 | 0 | 0 |
| 18 | 1 | 1 | 1 | 1 | 1 | 1 | 1 | 1 | 1 | 1 | 1 | 1 | 1 | 1 | 1 | 1 | 0 | 0 | 1 |
| 19 | 1 | 1 | 1 | 1 | 1 | 1 | 1 | 1 | 1 | 1 | 1 | 1 | 1 | 1 | 1 | 1 | 0 | 1 | 0 |
| ... | | | | | | | | | | | | | | | | | | | |
| bin | 0 | 1 | 2 | 3 | 4 | 5 | 6 | 7 | 8 | 9 | 10 | 11 | 12 | 13 | 14 | 15 | 16 | 17 | 18 | ... |

FIG. 26

| SYNTAX ELEMENT | CONTEXT INDEX INCREASE RANGE (ctxIdxInc) | maxBinIdx | CONTEXT INDEX OFFSET (ctxIdxOffset) |
|---|---|---|---|
| coded_block_pattern_luma | 73-76 | 3 | 73 |
| coded_block_pattern_chroma (YUV(OR YCbCr) 4:2:0) | 77-84 | 1 | 77 |
| coded_block_pattern_chroma444 (YUV(OR YCbCr) 4:4:4) | 73-76 | 7 | 73 |
| coded_block_flag | 85-104 | 0 | 85 |
| significant_coeff_flag | 105-165, 277-337, 402-416, 436-450 | 0 | 105,105, 402,402 |
| last_significant_coeff_flag | 166-226, 338-398, 417-425, 451-459 | 0 | 166,338, 417,451 |
| coeff_abs_level_minus1 | 227-275, 426-435 | 1 | 227,426 |

FIG. 27

| ctxIdx | I slice | | Cabac_init_idc | | | | | |
|---|---|---|---|---|---|---|---|---|
| | | | 0 | | 1 | | 2 | |
| | m | n | m | n | m | n | m | n |
| 73 | -17 | 127 | -27 | 126 | -39 | 127 | -36 | 127 |
| 74 | -13 | 102 | -28 | 98 | -18 | 91 | -17 | 92 |
| 75 | 0 | 82 | -25 | 101 | -17 | 96 | -14 | 95 |
| 76 | -7 | 74 | -23 | 67 | -26 | 81 | -25 | 84 |

FIG. 28

| BlockType | maxNumCoeff | CONTEXT BLOCK CATEGORY (ctxBlockCat) |
|---|---|---|
| DC TRANSFORM COEFFICIENT BLOCK OF LUMINANCE COMPONENT (16x16 MOD) | 16 | 0 |
| AC TRANSFORM COEFFICIENT BLOCK OF LUMINANCE COMPONENT (16x16 MOD) | 15 | 1 |
| 16 TRANSFORM COEFFICIENT OF LUMINANCE COMPONENT (4x4 MOD) | 16 | 2 |
| DC TRANSFORM COEFFICIENT OF CHROMINANCE COMPONENT (YUV (OR YCbCr) 4:2:0 IMAGE) | 16 | 3 |
| AC TRANSFORM COEFFICIENT OF CHROMINANCE COMPONENT (YUV (OR YCbCr) 4:2:0 IMAGE) | 8 | 4 |
| 64 TRANSFORM COEFFICIENT OF LUMINANCE COMPONENT (8x8 MODE) | 64 | 5 |
| DC TRANSFORM COEFFICIENT BLOCK OF CHROMINANCE COMPONENT (16x16 SINGLE MODE) (YUV (OR YCbCr) 4:4:4 IMAGE) | 16 | 0 |
| AC TRANSFORM COEFFICIENT BLOCK OF CHROMINANCE COMPONENT (16x16 SINGLE MODE) (YUV (OR YCbCr) 4:4:4 IMAGE) | 15 | 1 |
| 16 TRANSFORM COEFFICIENT OF CHROMINANCE COMPONENT (4x4 SINGLE MODE) (YUV (OR YCbCr) 4:4:4 IMAGE) | 16 | 2 |
| 64 TRANSFORM COEFFICIENT OF CHROMINANCE COMPONENT (8x8 SINGLE MODE) (YUV (OR YCbCr) 4:4:4 IMAGE) | 64 | 5 |

FIG. 29

| SYNTAX ELEMENT | ctxBlockC | | | | | |
|---|---|---|---|---|---|---|
| | 0 | 1 | 2 | 3 | 4 | 5 |
| coded_block_flag | 0 | 4 | 8 | 12 | 16 | - |
| significant_coeff_flag | 0 | 15 | 29 | 44 | 47 | 0 |
| last_significant_coeff_flag | 0 | 15 | 29 | 44 | 47 | 0 |
| coeff_abs_level_minus1 | 0 | 10 | 20 | 30 | 39 | 0 |

FIG. 30

| CBP(n) (n=0,,3) | DESCRIPTION IN MODES EXCLUDING I16x16 (FIGS. 21 AND 22) |
|---|---|
| 0 | ALL TRANSFORM COEFFICIENT VALUES OF 4 4x4 BLOCKS OF LUMINANCE COMPONENT BELONGING TO 8x8 BLOCK OF LUMINANCE COMPONENT ARE 0 |
| 1 | THERE EXISTS AT LEAST ONE NON-ZERO TRANSFORM COEFFICIENT VALUE AMONG 4 4x4 BLOCKS OF LUMINANCE COMPONENT BELONGING TO 8x8 BLOCK OF LUMINANCE COMPONENT |

FIG. 31

| CodedBlockPatternLuma | DESCRIPTION IN I16x16 MODE (FIGS. 21 AND 22) |
|---|---|
| 0 | ALL AC TRANSFORM COEFFICIENT VALUES OF LUMINANCE COMPONENT ARE 0 |
| 15 | THERE EXISTS AT LEAST ONE NON-ZERO TRANSFORM COEFFICIENT VALUE IN LUMINANCE COMPONENT BELONGING TO MACROBLOCK |

FIG. 32

| CBP(n) (n=4,···,11) (YUV(OR YCbCr) 4:4:4 IMAGE) | DESCRIPTION IN MODES EXCLUDING I16x16 (FIG. 21) |
|---|---|
| 0 | ALL TRANSFORM COEFFICIENT VALUES OF 8 4x4 BLOCKS OF CHROMINANCE COMPONENT BELONGING TO 8x8 BLOCK OF CHROMINANCE COMPONENT ARE 0 |
| 1 | THERE EXISTS AT LEAST ONE NON-ZERO TRANSFORM COEFFICIENT VALUE AMONG 8 4x4 BLOCKS OF CHROMINANCE COMPONENT BELONGING TO 8x8 BLOCK OF CHROMINANCE COMPONENT |

FIG. 33

| CodedBlockPatternChroma (YUV(OR YCbCr) 4:4:4 IMAGE) | DESCRIPTION IN I16x16 MODE (FIGS. 21 AND 22) |
|---|---|
| 0 | ALL TRANSFORM COEFFICIENT VALUES OF CHROMINANCE COMPONENT ARE 0 |
| 1 | THERE EXISTS AT LEAST ONE NON-ZERO DC TRANSFORM COEFFICIENT VALUE OF CHROMINANCE COMPONENT. ALL AC TRANSFORM COEFFICIENT VALUES OF CHROMINANCE COMPONENT ARE 0 |
| 2 | THERE EXISTS AT LEAST 0 NON-ZERO DC TRANSFORM COEFFICIENT VALUE OF CHROMINANCE COMPONENT. THERE EXISTS AT LEAST ONE NON-ZERO AC TRANSFORM COEFFICIENT VALUE OF CHROMINANCE COMPONENT |

FIG. 34

| CBP(n) (n=4,···,7) (YUV(OR YCbCr) 4:4:4 IMAGE) | DESCRIPTION IN MODES EXCLUDING I16x16 (FIG. 22) |
|---|---|
| 0 | ALL TRANSFORM COEFFICIENT VALUES OF 4 4x4 BLOCKS OF CHROMINANCE COMPONENT BELONGING TO 8x8 BLOCK OF CHROMINANCE COMPONENT ARE 0 |
| 1 | THERE EXISTS AT LEAST ONE NON-ZERO TRANSFORM COEFFICIENT VALUE AMONG 4 4x4 BLOCKS OF CHROMINANCE COMPONENT BELONGING TO 8x8 BLOCK OF CHROMINANCE COMPONENT |

FIG. 35

| CBP(n) (n=0,···,3) | DESCRIPTION IN MODES EXCLUDING I16x16 (FIG. 23) |
|---|---|
| 0 | ALL TRANSFORM COEFFICIENT VALUES OF 12 4x4 BLOCKS OF LUMINANCE AND CHROMINANCE COMPONENTS BELONGING TO 8x8 BLOCK OF LUMINANCE AND CHROMINANCE COMPONENTS ARE 0 |
| 1 | THERE EXISTS AT LEAST ONE NON-ZERO TRANSFORM COEFFICIENT VALUE AMONG 12 4x4 BLOCKS OF LUMINANCE AND CHROMINANCE COMPONENTS BELONGING TO 8x8 BLOCK OF LUMINANCE AND CHROMINANCE COMPONENT |

FIG. 36

| CBP(n) (n=0,...,3) | DESCRIPTION IN I16x16 MODE (FIG. 23) |
|---|---|
| 0 | ALL AC TRANSFORM COEFFICIENT VALUES OF 12 4x4 BLOCKS OF LUMINANCE AND CHROMINANCE COMPONENTS BELONGING TO 8x8 BLOCK OF LUMINANCE AND CHROMINANCE COMPONENTS ARE 0 |
| 1 | THERE EXISTS AT LEAST ONE NON-ZERO AC TRANSFORM COEFFICIENT VALUE AMONG 12 4x4 BLOCKS OF LUMINANCE AND CHROMINANCE COMPONENTS BELONGING TO 8x8 BLOCK OF LUMINANCE AND CHROMINANCE COMPONENT |

METHOD, MEDIUM, AND APPARATUS ENCODING AND/OR DECODING AN IMAGE USING THE SAME CODING MODE ACROSS COMPONENTS

CROSS-REFERENCE TO RELATED APPLICATIONS

This application claims the benefit of U.S. Provisional Patent Application No. 60/735,814, filed on Nov. 14, 2005, the benefit of Korean Patent Application No. 10-2006-0049079, filed on May 30, 2006 and the benefit of Korean Patent Application No. 10-2006-0110225, filed on May 30, 2006, in the Korean Intellectual Property Office, the disclosures of which are incorporated herein in their entirety by reference.

BACKGROUND OF THE INVENTION

1. Field of the Invention

An embodiment of the present invention relates to a method, medium, and apparatus encoding and/or decoding an image.

2. Description of the Related Art

Generally, when an image is captured, the image is captured in a RGB format. However, when the captured image is compressed, the image is typically transformed to an image of a YUV or YCbCr format. In this case, Y is a luminance component, such as a black and white image, and U (or Cb) and V (or Cr) are chrominance components of the corresponding image. Information is typically evenly distributed to R, G, and B in an RGB image, whereas in a YUV (or YCbCr) image, a majority of the information flows into the Y component while a small amount of information is distributed to U (or Cb) and V (or Cr) components. Thus, when compression of an image is performed, compression efficiency of a YUV (or YCbCr) image is greater than that of an RGB image as two of the components include less information. In order to further increase the compression efficiency, a YUV (or YCbCr) 4:2:0 image is used, where the U (or Cb) and V (or Cr) components are sampled ¼ as many times as the luminance component Y.

In this YUV (or YCbCr) 4:2:0 image, since a statistical characteristic of the Y component is different from a statistical characteristic of the U (or Cb) or V (or Cr) component, when conventional image compression is performed, the Y component and the U (or Cb) and V (or Cr) components are processed using different encoding techniques. For example, according to recently standardized MPEG-4 AVC/H.264 standard technology of a Joint Video Team of ISO/IEC MPEG and ITU-T VCEG ("Text of ISO/IEC FDIS 14496-10: Information Technology—Coding of Audio-Visual Objects—Part 10: Advanced Video Coding", ISO/IEC JTC 1/SC 29/WG 11, N5555, March, 2003) (hereinafter, called as MPEG4 AVC/H.264), when a Y component of a video signal is encoded to an intra-image, i.e., based on information within the image, spatial prediction is performed using 9 prediction techniques according to directions predicted based on 4×4 blocks. In addition, spatial prediction is performed using 4 prediction techniques according to directions predicted based on 16×16 blocks. However, for the U (or Cb) and V (or Cr) components of the video signal, since their images are relatively simple compared to the Y component, spatial prediction independent to the Y component is performed using 4 prediction techniques based on their respective directions predicted based on 8×8 blocks.

When encoding to an intra-image is performed, i.e., based on information from other images, motion compensation of the Y component is finely performed by expanding predicted images using a 6-tap filter, whereas motion compensation of the U (or Cb) and V (or Cr) components is performed by expending predicted images using a bi-linear filter. In this way, according to such conventional systems, an image is compressed using different techniques between the luminance and chrominance components since the statistical characteristic of the Y component is different from the statistical characteristic of the U (or Cb) or V (or Cr) component.

In addition, even when a residue image, e.g., obtained through temporal-spatial prediction, is entropy encoded using a binary arithmetic coder, the residue image is compressed using a method in which different probability models are used for the respective components. However, the sampling of U (or Cb) and V (or Cr) of a YUV (or YCbCr) 4:2:0 image by ¼ of the sampling of the Y component is not suitable for high image quality applications due to generated color distortions. Thus, a method of effectively encoding a YUV (or YCbCr) 4:4:4 image, where such a U (or Cb) and V (or Cr) sampling process is unnecessary, has been found to be desirable. Accordingly, by directly encoding an RGB image, color distortions occurring in such a YUV (or YCbCr) transforming process can be avoided.

However, if an image, such as a YUV (or YCbCr) 4:4:4 image or an RGB image, in which image components have the same resolution, are directly encoded, if MPEG-4 AVC/H.264, as a conventional YUV (or YCbCr) 4:2:0 image compression method, is applied to the image encoding efficiency decreases. This is caused by the application of a method suitable for U (or Cb) and V (or Cr) components of a YUV (or YCbCr) 4:2:0 image to a YUV (or YCbCr) 4:4:4 image or an RGB image without any change. Accordingly, embodiments of the present invention overcome these drawbacks.

SUMMARY OF INVENTION

An embodiment of the present invention provides an apparatus, medium, and method increasing encoding efficiency while retaining high image quality by performing spatial prediction and temporal prediction according to a statistical characteristic of an image when a YUV (or YCbCr) 4:4:4 image is encoded or an RGB image is encoded in an RGB domain without transforming the RGB image to the YUV (or YCbCr) domain.

Additional aspects and/or advantages of the invention will be set forth in part in the description which follows and, in part, will be apparent from the description, or may be learned by practice of the invention.

According to an aspect of the present invention, there is provided a method of generating a spatially predicted image, the method including generating a predicted image of a current image, including at least two image components, from pixels of a restored image spatially adjacent to a predetermined-sized block of the current image by applying a same predicted direction to each of the image components of the current image.

According to another aspect of the present invention, there is provided a medium including computer readable code to control at least one processing element to implement a method of generating a spatially predicted image, the method including generating a predicted image of a current image, including at least two image components, from pixels of a restored image spatially adjacent to a predetermined-sized block of the current image by applying a same predicted direction to each of the image components of the current image.

According to another aspect of the present invention, there is provided a method of generating a temporally predicted image, the method including generating a predicted image of a current image, including at least two image components, from motion estimation between a restored image and the current image by applying a same motion vector and a same motion interpolation method on a same block basis to each of the image components of the current image.

According to another aspect of the present invention, there is provided a medium including computer readable code to control at least one processing element to implement a method of generating a temporally predicted image, the method including generating a predicted image of a current image, including at least two image components, from motion estimation between a restored image and the current image by applying a same motion vector and a same motion interpolation method on a same block basis to each of the image components of the current image.

According to another aspect of the present invention, there is provided a method of generating a predicted image, the method including generating a spatially predicted image of a current image, including at least two image components, by applying a same predicted direction to each of the image components of the current image, generating a temporally predicted image of the current image by applying a same motion vector and a same motion interpolation method on a same block basis to each of the image components of the current image, selecting an encoding mode for the current image using the generated spatially predicted image and the generated temporally predicted image, and generating a predicted image of the current image by applying the selected encoding mode to each of the image components of the current image.

According to another aspect of the present invention, there is provided a medium including computer readable code to control at least one processing element to implement a method of generating a predicted image, the method including generating a spatially predicted image of a current image, including at least two image components, by applying a same predicted direction to each of the image components of the current image, generating a temporally predicted image of the current image by applying a same motion vector and a same motion interpolation method on the a same block basis to each of the image components of the current image, selecting an encoding mode for the current image using the generated spatially predicted image and the generated temporally predicted image, and generating a predicted image of the current image by applying the selected encoding mode to each of the image components of the current image.

According to another aspect of the present invention, there is provided an apparatus for generating a predicted image, the apparatus including a spatial prediction image generator to generate a spatially predicted image of a current image, including at least two image components, by applying a same predicted direction to each of the image components of the current image, a temporal prediction image generator to generate a temporally predicted image of the current image by applying a same motion vector and a same motion interpolation method on a same block basis to each of the image components of the current image, an encoding mode selector to select an encoding mode using the generated spatially predicted image and the generated temporally predicted image, and a single mode prediction image generator to generate a predicted image of the current image by applying the selected encoding mode to each of the image components of the current image.

According to another aspect of the present invention, there is provided a method of encoding an image, the method including generating a predicted image of a current image, including at least two image components, by applying a same encoding mode to each of the image components of the current image, generating a respective residue corresponding to a difference between the current image and the generated predicted image for each image component of the current image, and generating a bitstream by encoding the generated respective residues.

According to another aspect of the present invention, there is provided a medium including computer readable code to control at least one processing element to implement a method of encoding an image, the method including generating a predicted image of a current image, including at least two image components, by applying a same encoding mode to each of the image components of the current image, generating a respective residue corresponding to a difference between the current image and the generated predicted image for each image component of the current image, and generating a bitstream by encoding the generated respective residues.

According to another aspect of the present invention, there is provided an apparatus for encoding an image, the apparatus including a prediction image generator to generate a predicted image of a current image, including at least two image components, by applying a same encoding mode to each of the image components of the current image, a residue generator to generate a respective residue corresponding to a difference between the current image and the generated predicted image for each image component of the current image, and an encoder to generate a bitstream by encoding the generated respective residues.

According to another aspect of the present invention, there is provided a method of decoding an image, the method including restoring respective residues for image components of a current image, which includes at least two image components, with the respective residues corresponding to a difference between the current image and a predicted image, and restoring the current image by adding the predicted image, generated by applying a same encoding mode to the restored respective residues, to the restored respective residues.

According to another aspect of the present invention, there is provided a medium including computer readable code to control at least one processing element to implement a method of decoding an image, the method including restoring respective residues for image components of a current image, which includes at least two image components, with the respective residues corresponding to a difference between the current image and a predicted image, and restoring the current image by adding the predicted image, generated by applying a same encoding mode to restored respective residues, to the restored respective residues.

According to another aspect of the present invention, there is provided an apparatus for decoding an image, the apparatus including a data restoration unit to restore respective residues for image components of a current image, which includes at least two image components, with the respective residues corresponding to a difference between the current image and a predicted image, and a prediction compensator to restore the current image by adding the predicted image, generated by applying a same encoding mode to restored respective residues, to the restored respective residues.

According to another aspect of the present invention, there is provided a context-based binary arithmetic coding method including binarizing respective syntax elements used to encode a respective residue, which correspond to least two image components and a difference between a current image and a predicted image, selecting a respective context index information of the respective syntax elements for each of the image components of the current image, and binary-arithmetic coding the respective syntax elements based on a same probability model having a same syntax element probability value for the selected respective context index information for each of the image components of the current image.

According to another aspect of the present invention, there is provided a medium including computer readable code to control at least one processing element to implement a context-based binary arithmetic coding method including binarizing respective syntax elements used to encode a respective residue, which correspond to least two image components and a difference between a current image and a predicted image, selecting respective context index information of the respective syntax elements for each of the image components of the current image, and binary-arithmetic coding the respective syntax elements using a same probability model having a same syntax element probability value for the selected respective context index information for each of the image components of the current image.

According to another aspect of the present invention, there is provided a context-based binary arithmetic coding apparatus including a binarization unit to binarize respective syntax elements used to encode a respective residue, which correspond to least two image components and a difference between a current image and a predicted image, a context index selector to select respective context index information of the respective syntax elements for each of the image components of the current image, and a binary arithmetic coder binary-arithmetic coding the respective syntax elements using a same probability model having a same syntax element probability value for the selected respective context index information of each of the image components of the current image.

According to another aspect of the present invention, there is provided a context-based binary arithmetic decoding method including selecting respective context index information of respective syntax elements used to encode a respective residue, which correspond to at least two image components and a difference between a current image and a predicted image, restoring respective binary values of the respective syntax elements by performing binary-arithmetic decoding on the respective binary values of the respective syntax elements using a same probability model having a same syntax element probability value for the selected respective context index information for each of the image components of the current image, and restoring the respective syntax elements by inverse-binarizing the restored respective binary values of the respective syntax elements.

According to another aspect of the present invention, there is provided a medium including computer readable code to control at least one processing element to implement a context-based binary arithmetic decoding method including selecting respective context index information of respective syntax elements used to encode a respective residue, which correspond to at least two image components and a difference between a current image and a predicted image, restoring respective binary values of the respective syntax element by binary-arithmetic decoding the respective binary values of the respective syntax element using a same probability model having a same syntax element probability value for the selected respective context index information of each of the image components of the current image, and restoring the respective syntax elements by inverse-binarizing the respective restored binary values of the respective syntax elements.

According to another aspect of the present invention, there is provided a context-based binary arithmetic decoding apparatus including a context index selector to select respective context index information of respective syntax elements used to encode a respective residue, which corresponds to at least two image components and a difference between a current image and a predicted image, a binary arithmetic decoder to restore respective binary values of the respective syntax elements by performing binary-arithmetic decoding the respective binary values of the respective syntax elements using a same probability model having a same syntax element probability value for the selected respective context index information of each of the image components of the current image, and an inverse binarization unit to restore the respective syntax elements by inverse-binarizing the restored respective binary values of the respective syntax elements.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 8A and 8B illustrate locations of adjacent pixels, locations of pixels of a current block to be predicted, and predicted directions, for spatial prediction in an I4×4 encoding mode;

FIG. 9 illustrates a method of dividing a macroblock in a temporal prediction mode, according to an embodiment of the present invention;

FIG. 25 illustrates a combination of a truncated unary code and an exponential Golomb code;

FIG. 26 illustrates a table presenting syntax elements for restoring luminance and chrominance components, and context index information and context index offset information corresponding to the syntax elements, according to an embodiment of the present invention;

FIG. 27 illustrates a table presenting context index information of binary values of CBP information and probability model information corresponding to the context index information, according to an embodiment of the present invention;

FIG. 28 illustrates a table presenting block types of a transformed and quantized residue, and the number of coefficients and context block category information corresponding to each of the block types, according to an embodiment of the present invention;

FIG. 29 illustrates a table presenting syntax elements of a transformed and quantized residue, and context index increase values due to context block category information, according to an embodiment of the present invention;

FIG. 30 illustrates a table presenting CBP information, such as that illustrated in FIGS. 21A-21B and 22A-22B, of a luminance component in encoding modes excluding I16×16, according to an embodiment of the present invention;

FIG. 31 illustrates a table presenting CBP information, such as that illustrated in FIGS. 21A-21B and 22A-22B, of a luminance component in an I16×16 encoding mode, according to an embodiment of the present invention;

FIG. 32 illustrates a table presenting CBP information, such as that illustrated in FIGS. 21A-21B, of a chrominance component in the encoding modes excluding I16×16, according to an embodiment of the present invention;

FIG. 33 illustrates a table presenting CBP information, such as that illustrated in FIGS. 21A-21B, of a chrominance component in the I16×16 encoding mode, according to an embodiment of the present invention;

FIG. 34 illustrates a table presenting CBP information, such as that illustrated in FIGS. 22A-22B, of a chrominance component in the encoding modes excluding I16×16, according to an embodiment of the present invention;

FIG. 35 illustrates a table presenting CBP information, such as that illustrated in FIGS. 23A-23B, of a color component in the encoding modes excluding I16×16, according to an embodiment of the present invention; and FIG. 36 illustrates a table presenting CBP information, such as that illustrated in FIGS. 23A-23B, of a color component in the I16×16 encoding mode, according to an embodiment of the present invention.

DETAILED DESCRIPTION OF EMBODIMENTS

Figure 1:
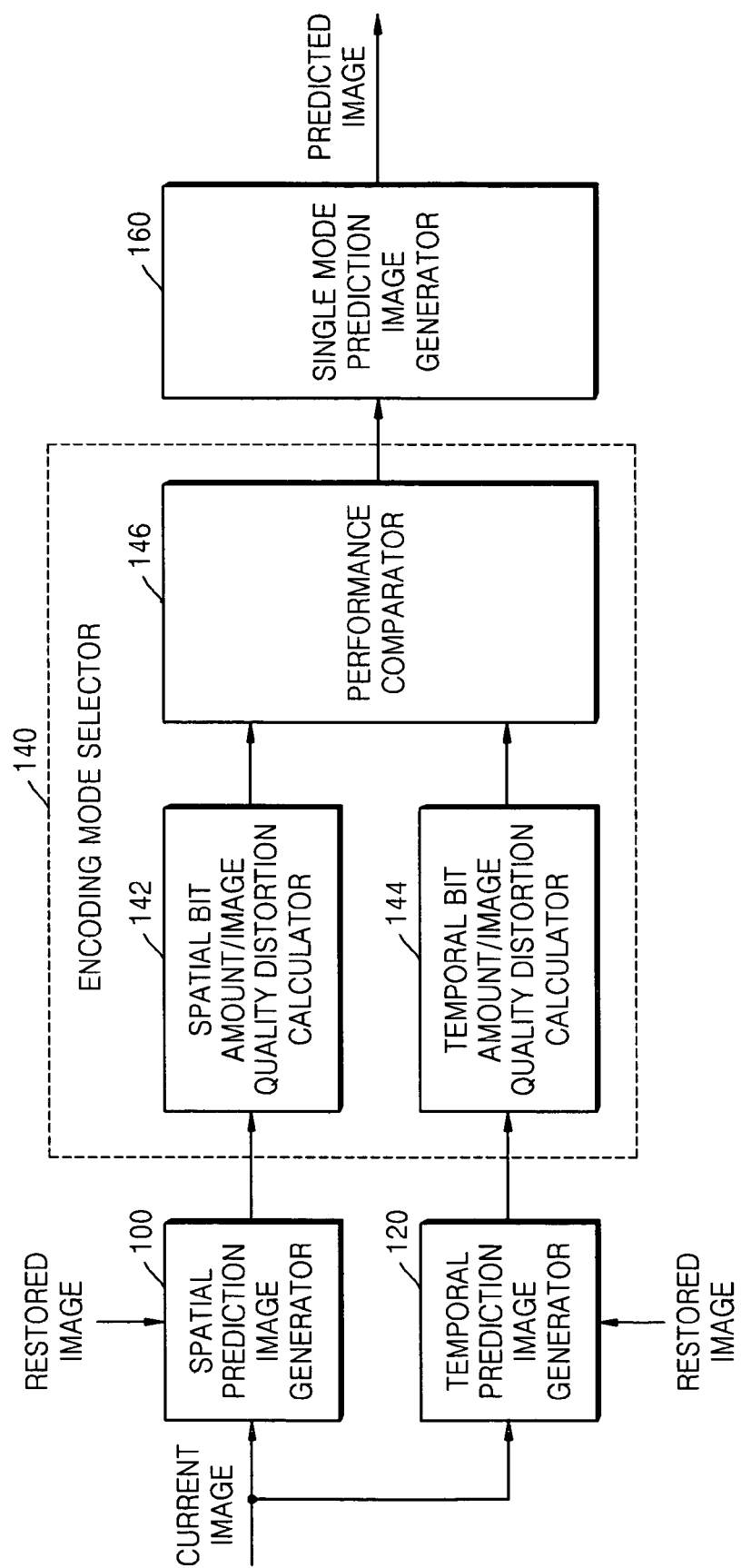
FIG. 1 illustrates an apparatus generating a predicted image, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

Herein, embodiments described below are related to encoding/decoding of a current image having of at least two image components by applying the same encoding mode to each of the image components. In particular, the current image can be either an RGB image or a YUV (or YCbCr) 4:4:4 image, for example. However, although a YUV image has been discussed below as a current image and in the attached drawings, it should be understood by those of ordinary skill in the art that the current image can be any of a YCbCr or RGB image, or any other format image.

Accordingly, FIG. 1 illustrates an apparatus for generating a predicted image, according to an embodiment of the present invention.

Referring to FIG. 1, the predicted image generation apparatus may include a spatial prediction image generator 100, a temporal prediction image generator 120, an encoding mode selector 140, and a single mode prediction image generator 160, for example. The predicted image generation apparatus, as illustrated in FIG. 1, processes a current image based on blocks within the image. In addition, in order to increase encoding efficiency of a predicted image, the predicted image generation apparatus, according to an embodiment, may use an inter-prediction method of predicting a current image by estimating a motion of the current image from a restored image, i.e., from a corresponding encoding output of a preceding image and then decoded for feedback comparisons, and an intra-prediction method of predicting a current image from pixels of a restored image, i.e., an encoding output of the current image that is then decoded for feedback comparisons, with the restored image data being from a block spatially adjacent to a predetermined-sized block of the current image. In particular, according to such an embodiment, the predicted image generation apparatus illustrated in FIG. 1 selects the most effective encoding mode from among a plurality of encoding modes.

In a spatial prediction mode, i.e., the intra-prediction mode, the spatial prediction image generator 100 generates a spatially predicted image of a current image, which includes at least two image components, from pixels of the restored image spatially adjacent to the predetermined-sized pixel block of the current image by applying the same predicted direction to each of the image components of the current image. For example, if the current image is an RGB image, the spatial prediction image generator 100 generates a spatially predicted image by applying the same predicted direction to each of an R component, a G component, and a B component. In particular, the spatial prediction image generator 100 generates a spatially predicted image for each of a plurality of encoding modes in the intra-prediction mode.

In this regard, FIG. 8A illustrates locations of adjacent pixels and locations of pixels of a current block to be predicted, and FIG. 8B illustrates predicted directions, both for spatial prediction in an I4×4 encoding mode.

Referring to FIG. 8A, if the size of a pixel block is 4×4, the spatial prediction image generator 100 determines one of 9 predicted directions for the same predicted direction for all corresponding blocks having the 4×4 size and generates a spatially predicted image by applying the determined predicted direction to each of the R component, the G component, and the B component. This is called the I4×4 encoding mode. If the size of a pixel block is 8×8, the spatial prediction image generator 100 determines one of the 9 predicted directions for the same predicted direction and generates a spatially predicted image by applying the determined predicted direction to each of the R component, the G component, and the B component, as well as in the I4×4 encoding mode. This is called an I8×8 encoding mode. Similarly, if the size of a pixel block is I6×16, the spatial prediction image generator 100 determines one of 4 predicted directions for the same predicted direction and generates a spatially predicted image by applying the determined predicted direction to each of the R component, the G component, and the B component.

FIG. 8A further shows locations of adjacent pixels and locations of pixels of a current block to be predicted, for spatial prediction in the I4×4 encoding mode. This method is similar to that used in MPEG-4 AVC/H.264. As illustrated in FIG. 8A, in order to predict 4×4 block data $P_a, P_b, \ldots, P_q$, spatially adjacent data $P_0, P_1, \ldots, P_{12}$, which has been previously encoded and restored, is used. FIG. 8B shows 9 predicted directions 0 through 8 used to predict the current block through projection from spatially adjacent pixels. For example, in the case of the direction 0, by projecting adjacent pixel values $P_1, P_2, P_3$, and $P_4$ in a vertical direction, pixel values $P_a, P_e, P_j$, and $P_m$ are predicted to the pixel value $P_1$, pixel values $P_b, P_f, P_j$, and $P_h$ to the pixel value $P_2$, pixel values $P_c, P_g, P_k$, and $P_o$ to the pixel value $P_3$, and pixel values $P_d, P_h, P_l$, and $P_p$ to the pixel value $P_4$. Likewise, for the other directions, pixel values are predicted through projection.

Referring again to FIG. 1, in a temporal prediction mode, i.e., an inter-prediction mode, the temporal prediction image generator 120 generates a temporally predicted image of the current image, which includes at least two image components, from motion estimation of each of the image components between a restored image and the current image by applying the same motion vector and the same motion interpolation method on the same block basis for each of the image components. For example, if the current image is an RGB image, the temporal prediction image generator 120 uses the same motion vector on the same block basis for each of an R component, a G component, and a B component. In addition, the temporal prediction image generator 120 generates a temporally predicted image by performing interpolation using the same filter for each of the R component, the G component, and the B component when a predicted image is extended. In particular, the temporal prediction image generator 120 generates a temporally predicted image for each of a plurality of encoding modes in the inter-prediction mode.

FIG. 9 illustrates a method of partitioning a macroblock in such a temporal prediction mode.

Referring to FIG. 9, the temporal prediction image generator 120 may expand a predicted image by interpolating it in order to minutely perform motion prediction. The temporal prediction image generator 120 can interpolate the predicted image using a 6-tap filter or a bi-linear filter, for example. The 6-tap and bi-linear filters are widely used in MPEG-4 AVC/H.264. In particular, the 6-tap filter is [1, −5, 20, 20, −5, 1] and performs the motion prediction up to a ¼-pixel unit. In addition, compared to the case when the 6-tap filter is used, the bi-linear filter uses a relatively less number of surrounding pixels and uses surrounding values adjacent to a value to be interpolated.

In particular, according to the current embodiment, the temporal prediction image generator 120 can use the 6-tap filter for all of an R component, a G component, and a B component in order to apply the same interpolation method to each of the R component, the G component, and the B component. Alternatively, the temporal prediction image generator 120 can use the bi-linear filter for all of the R component, the G component, and the B component. Furthermore, in an embodiment, each block can be encoded using an optimal method for that block and transmitted to an image decoding apparatus.

Referring back to FIG. 1, the encoding mode selector 140 may select a single encoding mode using the spatially predicted image, e.g., generated by the spatial prediction image generator 100, and the temporally predicted image, e.g., generated by the temporal prediction image generator 120. In particular, the encoding mode selector 140 may include a spatial bit amount/image quality distortion calculator 142, a temporal bit amount/image quality distortion calculator 144, and a performance comparator 146, for example.

In this embodiment, the spatial bit amount/image quality distortion calculator 142 may calculate the bit amount and image quality distortion of the spatially predicted image, e.g., generated by the spatial prediction image generator 100. Similarly, the temporal bit amount/image quality distortion calculator 144 may calculate the bit amount and image quality distortion of the temporally predicted image, e.g., generated by the temporal prediction image generator 120. In particular, here, the spatial bit amount/image quality distortion calculator 142 calculates the bit amount and image quality distortion of the spatially predicted image generated by the spatial prediction image generator 100 in each of the encoding modes of the intra-prediction method, and the temporal bit amount/image quality distortion calculator 144 calculates the bit amount and image quality distortion of the temporally predicted image generated by the temporal prediction image generator 120 in each of the encoding modes of the inter-prediction method.

Figure 3:
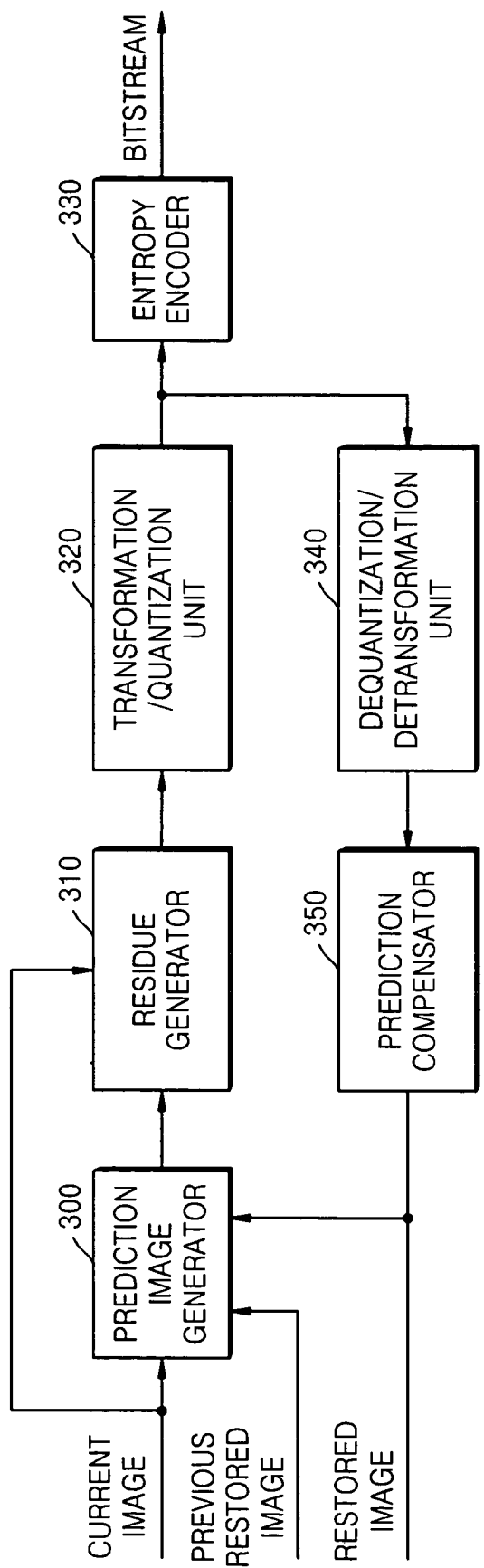
FIG. 3 illustrates an apparatus encoding an image, according to an embodiment of the present invention.

In more detail, the spatial bit amount/image quality distortion calculator 142 and the temporal bit amount/image quality distortion calculator 144 may calculate the bit amount of the spatially or temporally predicted image using a bitstream output from an entropy encoder, such as the entropy encoder 330 of an image encoding apparatus illustrated in FIG. 3. In addition, the spatial bit amount/image quality distortion calculator 142 and the temporal bit amount/image quality distortion calculator 144 may calculate the image quality distortion of spatially or temporally predicted image using a mean value, for example, of a value obtained by summing values obtained by squaring each of difference values between a restored image and an original image, which is represented by the below Equation 1.

$$D = \sum_{i=0}^{N} (p_i - q_i)^2 \quad \text{Equation 1}$$

Here, D denotes a numeric value representing a degree of image quality distortion, p denotes a pixel value of a current image, q denotes a pixel value of a previous image, and i denotes an index of pixels in a current block.

The performance comparator 146 may sum the bit amount and the image quality distortion calculated by the spatial bit amount/image quality distortion calculator 142, for example, and sum the bit amount and the image quality distortion calculated by the temporal bit amount/image quality distortion calculator 144. The performance comparator 146 may further compare the summed values to each other and select the appropriate encoding mode corresponding to the smallest value, i.e., an encoding mode having the highest encoding efficiency, as a single encoding mode, as one example of determining the appropriate encoding mode. In more detail, in this embodiment, the performance comparator 146 sums the bit amount and the image quality distortion by multiplying a fixed constant in order to coordinate a unit of the bit amount and a unit of the image quality distortion, as represented by the below Equation 2.

$$L=D+\lambda R \qquad \text{Equation 2}$$

Here, R denotes a bit rate, and λ denotes the fixed constant. That is, the performance comparator 146 may calculate L for a plurality of encoding modes and select an encoding mode corresponding to the smallest value of the calculated L's as the single encoding mode.

The single mode prediction image generator 160, thus, may generate a predicted image of the current image by evenly applying the single encoding mode selected by the encoding mode selector 140 to each of the image components of the current image.

Though, in this embodiment the encoding mode selector 140 selects an encoding mode having the highest encoding efficiency, an encoding mode having the highest encoding efficiency may alternately, or used in combination, be selected for other elements, depending on the situation.

Figure 2:
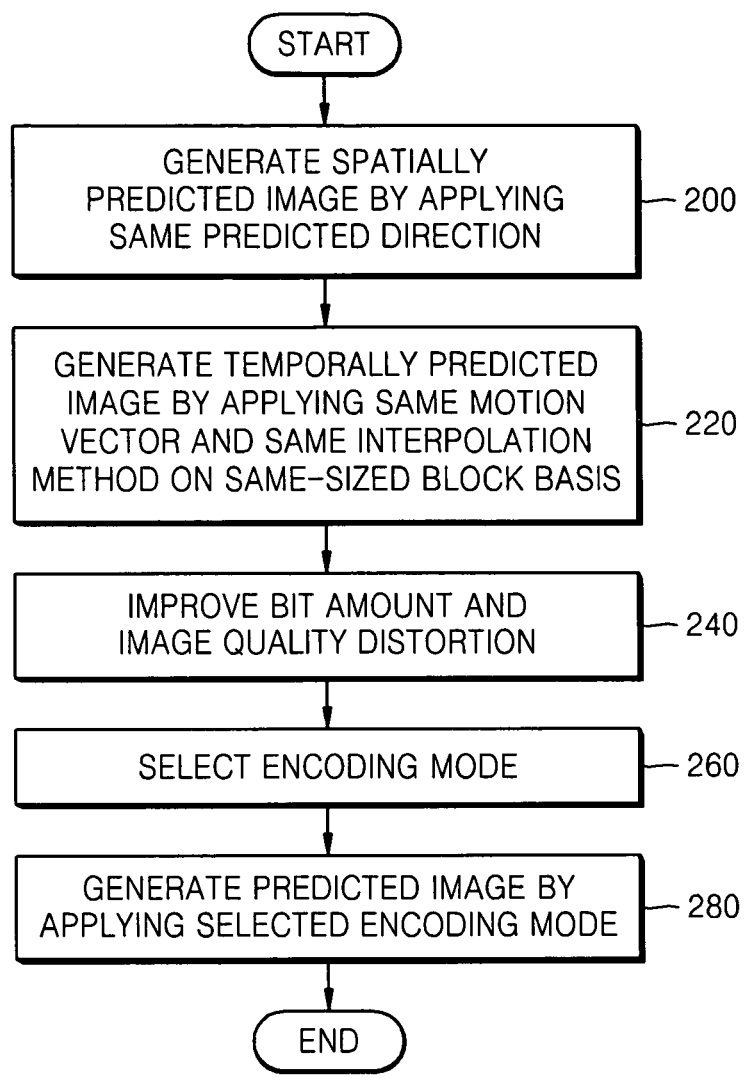
FIG. 2 illustrates a method of generating a predicted image, according to an embodiment of the present invention.

FIG. 2 illustrates a method of generating a predicted image, according to an embodiment of the present invention.

Referring to FIG. 2, the predicted image generation method may include operations sequentially processed in a time domain by a predicted image generation apparatus, such as that illustrated in FIG. 1. Thus, even if omitted, corresponding operations regarding the predicted image generation apparatus of FIG. 1 may also be available in differing predicted image generation method embodiments.

In operation 200, a spatially predicted image of a current image may be generated, with the current image including at least two image components, from pixels of a restored image spatially adjacent to a predetermined-sized pixel block of the current image by applying the same predicted direction to each of the image components of the current image.

In operation 220, a temporally predicted image of the current image may be generated from motion estimation of each of the image components between a restored image and the current image by applying the same motion vector and the same motion interpolation method on the same block basis for each of the image components.

In operation 240, the bit amount and image quality distortion of the spatially predicted image, e.g., generated in operation 200, and the bit amount and image quality distortion of the temporally predicted image, e.g., generated in operation 220, may be generated.

In operation 260, the bit amount and the image quality distortion calculated for the spatially predicted image, generated in operation 240, may be summed, the bit amount and the image quality distortion calculated for the temporally predicted image, generated in operation 240, may be summed, the summed values may be compared to each other, and an encoding mode corresponding to the smallest value may be selected as a single encoding mode to be used.

In operation 280, a predicted image of the current image may be generated by applying the single encoding mode, e.g., selected in operation 260, to each of the image components of the current image.

FIG. 3 illustrates an apparatus for encoding an image, according to an embodiment of the present invention.

Referring to FIG. 3, the image encoding apparatus according to the current embodiment may include a prediction image generator 300, a residue generator 310, a transformation/quantization unit 320, an entropy encoder 330, a dequantization/detransformation unit 340, and a prediction compensator 350, for example.

The prediction image generator 300 may generate a predicted image of a current image, which includes at least two image components, by applying the same encoding mode to each of the image components. The prediction image generator 300 may use the predicted image generation apparatus illustrated in FIG. 1 without need for modification, for example. Thus, the prediction image generator 300 may further include the spatial prediction image generator 100, the temporal prediction image generator 120, the encoding mode selector 140, and the single mode prediction image generator 160 illustrated in FIG. 1, for example.

The residue generator 310 may generate a residue corresponding to a difference between the current image and the predicted image generated by the prediction image generator 300. For example, if an input image is a YUV (or YCbCr) 4:4:4 image, when a spatial prediction mode is selected, the prediction image generator 300 applies the same prediction mode to all of a Y component, a U (or Cb) component, and a V (or Cr) component. When a temporal prediction mode is selected, the prediction image generator 300 applies the same motion vector on the same block basis to all of the Y component, the U (or Cb) component, and the V (or Cr) component, and when the predicted image is expanded, the prediction image generator 300 performs interpolation using the same filter for all of the Y component, the U (or Cb) component, and the V (or Cr) component. By performing the spatial or temporal prediction encoding according to the encoding mode selected as described above, for example, the residue generator 310 can generate a residue of each of the Y component, the U (or Cb) component, and the V (or Cr) component.

The transformation/quantization unit 320 may transform and quantize the residue generated by the residue generator 310 on predetermined-sized block basis. In more detail, the transformation/quantization unit 320 may perform the transformation using an orthogonal transform encoding method. Popularly used methods in the orthogonal transform encoding method are a Fast Fourier Transform (FFT) method, a Discrete Cosine Transform (DCT) method, a Karhunen Loeve Transform (KLT) method, a Hadamard transform method, and a slant transform method, for example.

Figure 10A:
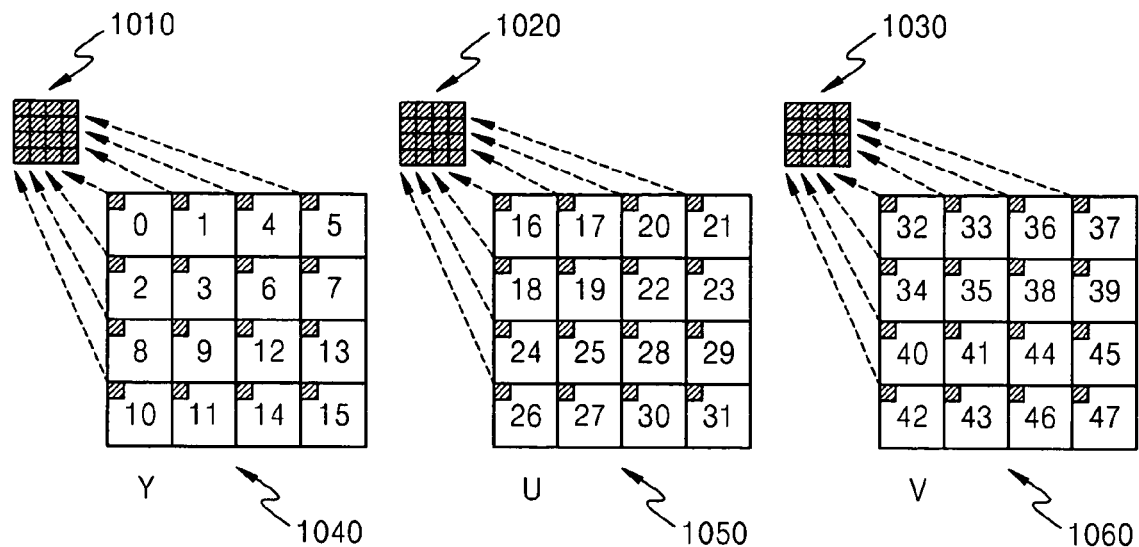
FIGS. 10A and 10B illustrate a transformation and quantization performed by a transformation/quantization unit, such as that illustrated in FIG. 3, according to an embodiment of the present invention.
Figure 10B:
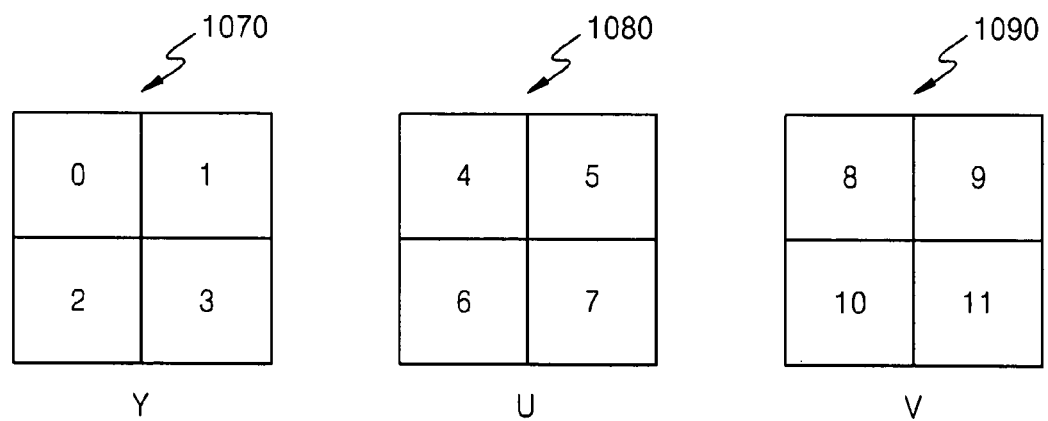

FIGS. 10A and 10B illustrate such a transformation and quantization, e.g., as performed by the transformation/quantization unit 320 illustrated in FIG. 3.

In MPEG-4 AVC/H.264, each of a luminance component Y 1040 and chrominance components U (or Cb) 1050 and V (or Cr) 1060 may be transformed on 4×4 block basis, as illustrated in FIG. 10A. In an I16×16 encoding mode in which spatial prediction is performed on 6×16 block basis, e.g., by the spatial prediction image generator 100 illustrated in FIG. 1, only a Direct Current (DC) component of each block of a macroblock is gathered and additionally transformed and quantized on 4×4 block basis for a luminance component Y 1010 and chrominance components U (or Cb) 1020 and V (or Cr) 1030. FIG. 10B illustrates a luminance component Y 1070 and chrominance components U (or Cb) 1080 and V (or Cr) 1090 transformed on 8×8 block basis.

Referring back to FIG. 3, the entropy encoder 330 may generate a bitstream by entropy encoding the data transformed and quantized by the transformation/quantization unit 320.

Figure 11A:
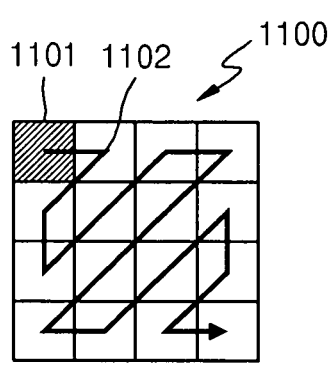
FIGS. 11A and 11B illustrate zigzag scanning performed by an entropy encoder, such as that illustrated in FIG. 3.
Figure 11B:
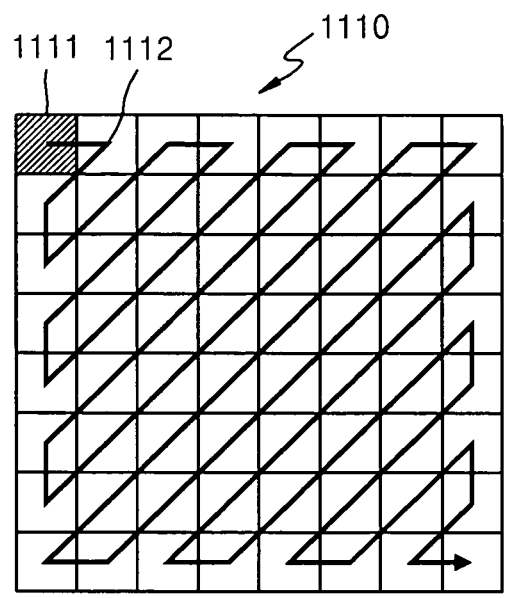

FIGS. 11A and 11B illustrate an example zigzag scanning that can be performed by the entropy encoder 330 illustrated in FIG. 3.

In order to efficiently generate a bitstream in the entropy encoder 330 illustrated in FIG. 3 using transformed and quantized residue coefficients, such as those obtained according to FIGS. 10A and 10B, FIG. 11A shows how to obtain one-dimensional data steam for entropy encoding from two-dimensional data by zigzag scanning (referring to 1102) quantized coefficients of a 4×4 transformed residue 1100 by starting from a DC coefficient 1101. Similarly, FIG. 11B shows how to obtain one-dimensional data stream for entropy encoding from two-dimensional data by zigzag scanning (referring to 1112) quantized coefficients of a 8×8 transformed residue 1110 by starting from a DC coefficient 1111.

Referring back to FIG. 3, the dequantization/detransformation unit 340 and the prediction compensator 350 may respectively perform dequantization/detransformation and prediction compensation of the data transformed and quantized by the transformation/quantization unit 320 in order to generate the aforementioned current restored image and the aforementioned previous restored image required to generate the predicted image in the prediction image generator 300.

Figure 4:
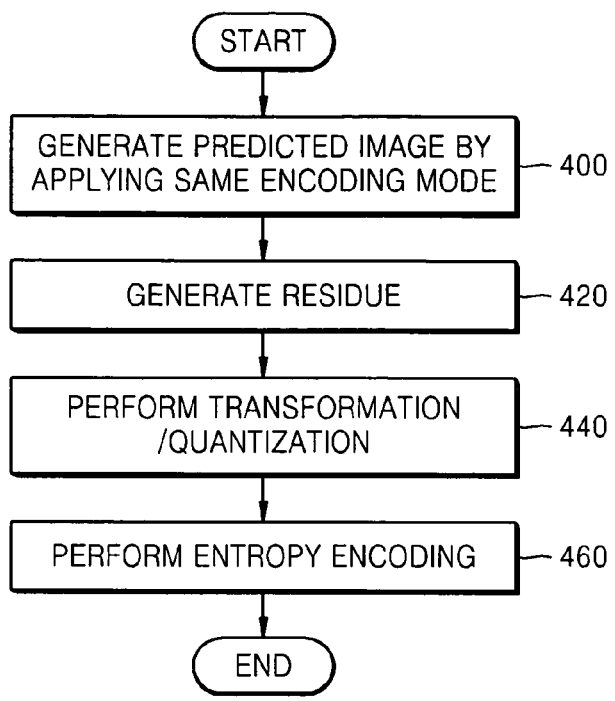
FIG. 4 illustrates a method of encoding an image, according to an embodiment of the present invention.

FIG. 4 illustrates a method of encoding an image, according to an embodiment of the present invention.

Referring to FIG. 4, the image encoding method may include operations sequentially processed, for example, in the time domain by the image encoding apparatus illustrated in FIG. 3. Thus, even if omitted, operations corresponding to aspects of the image encoding apparatus illustrated in FIG. 3 may further be implemented in the image encoding method, according to differing embodiments.

In operation 400, a predicted image of a current image, which includes at least two image components, may be generated by applying the same encoding mode to each of the image components.

In operation 420, a residue corresponding to the difference between the current image and the predicted image generated may be generated, in operation 400.

In operation 440, the residue, generated in operation 420, may be transformed and quantized on predetermined-sized block basis.

In operation 460, a bitstream may be generated by entropy encoding the data transformed and quantized in operation 440.

Figure 5:
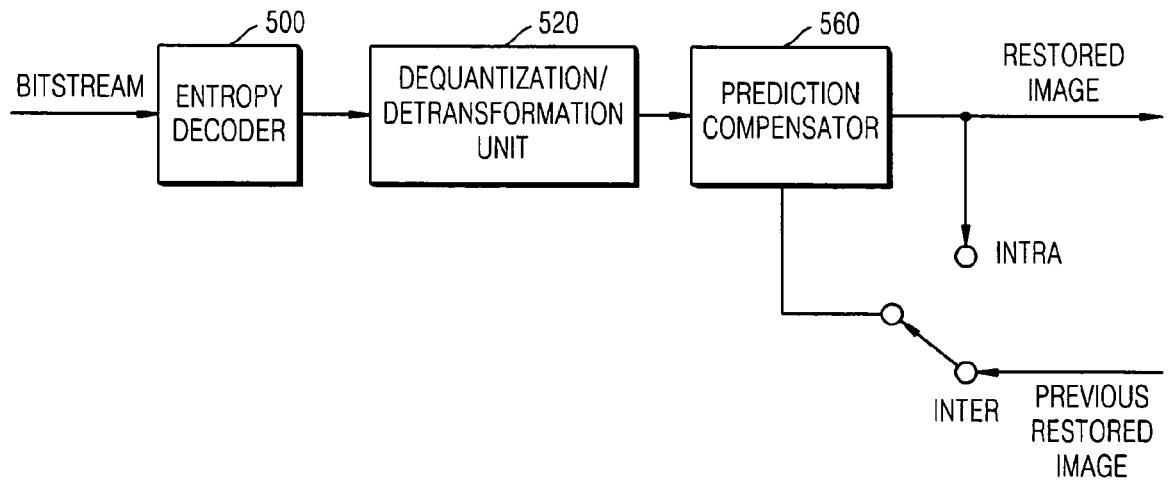
FIG. 5 illustrates an apparatus decoding an image, according to an embodiment of the present invention.

FIG. 5 illustrates an apparatus for decoding an image, according to an embodiment of the present invention.

Referring to FIG. 5, the image decoding apparatus may include an entropy decoder 500, a dequantization/detransformation unit 520, and a prediction compensator 540, for example.

The entropy decoder 500 entropy-decodes a bitstream, with the dequantization/detransformation unit 520 restoring a residue of each of image components corresponding to a difference between a predicted image and a current image, which include at least two image components, by dequantizing and detransforming the result entropy-decoded by the entropy decoder 500 on predetermined-sized block basis. The prediction compensator 540 may, thus, restore the current image by adding a predicted image, generated by applying the same encoding mode to the residue of each of the image components which is restored by the dequantization/detransformation unit 520, to the restored residue.

Figure 7:
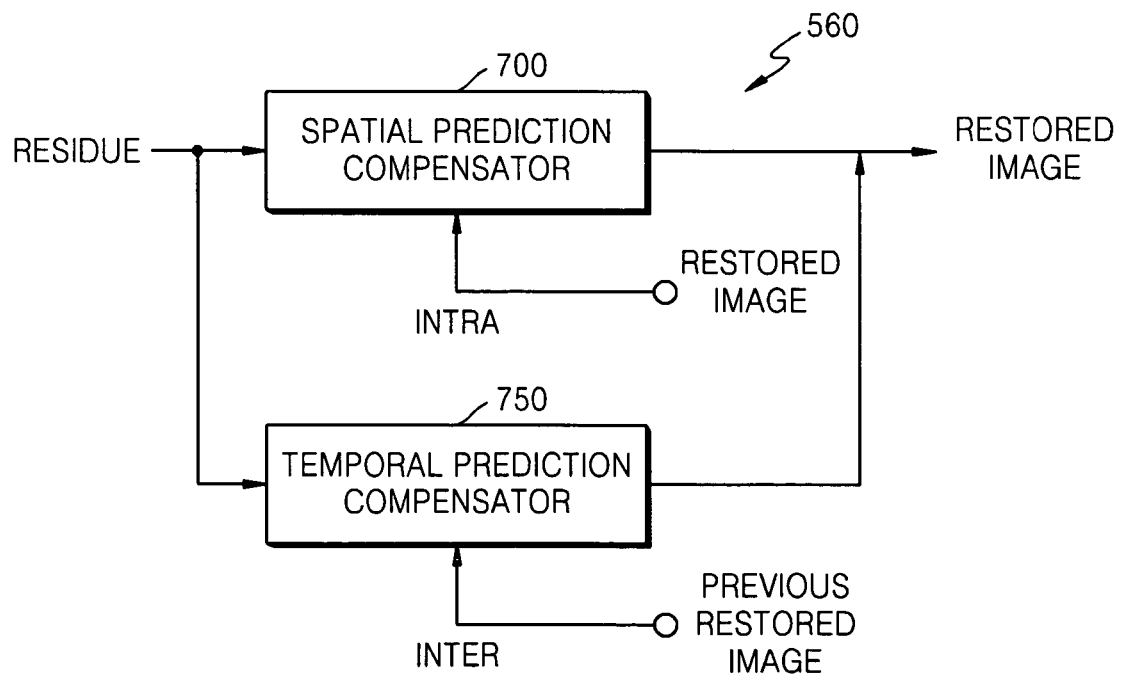
FIG. 7 illustrates a prediction compensator, such as that illustrated in FIG. 5, according to an embodiment of the present invention.

FIG. 7 illustrates a prediction compensator 540, such as that illustrated in FIG. 5.

Referring to FIG. 7, the prediction compensator 540 may include a spatial prediction compensator 700 and a temporal prediction compensator 750, for example.

If the residue of each of the image components, e.g., restored by the dequantization/detransformation unit 520, has been encoded in the intra-prediction method, the spatial prediction compensator 700 may restore the current image by adding a predicted image, generated from pixels of a restored image spatially adjacent to a predetermined-sized block of the current image by applying the same predicted direction to each of the image components, to the residue of each of such image components restored by the dequantization/detransformation unit 520.

If the residue of each of the image components, e.g., restored by the dequantization/detransformation unit 520, has been encoded in the inter-prediction method, the temporal prediction compensator 750 may restore the current image by adding a predicted image, generated from motion estimation between a restored image and the current image by applying the same motion vector and the same motion interpolation method on the same block basis to each of the image components, to the residue of each of such image components restored by the dequantization/detransformation unit 520.

In general, the entropy encoding may be used to generate a bitstream by compressing a residue corresponding to the result transformed and quantized by the transformation/quantization unit 320 illustrated in FIG. 3. Representative examples of the entropy encoding are Huffman encoding and arithmetic coding. MPEG-4 AVC/H.264 allows a user to selectively use the Huffman encoding or the arithmetic coding when a bitstream is generated. Among them, the arithmetic coding has a disadvantage in that it has higher complexity than the Huffman encoding but has an advantage in that it has a high compression ratio since it generates an encoding code according to a statistical characteristic of data. In an embodiment of the present invention, context-based binary arithmetic coding in which the same probability model is applied to each image component will be described in greater detail later.

Figure 6:
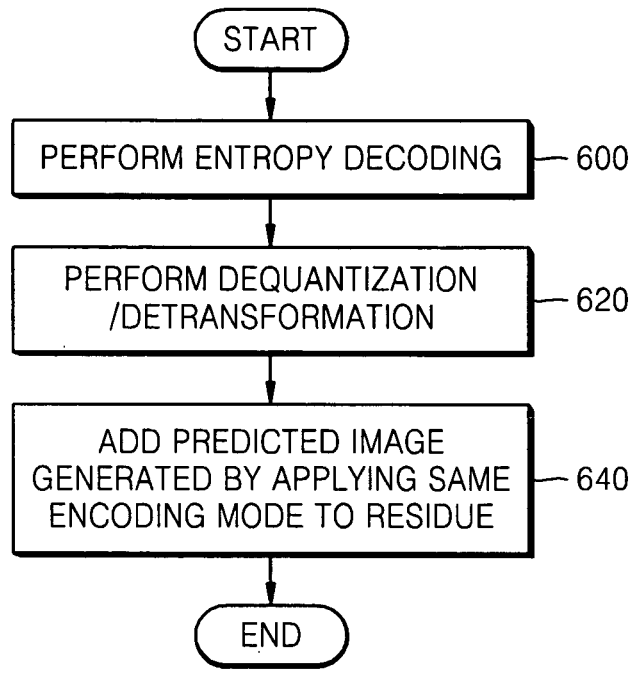
FIG. 6 illustrates a method of decoding an image, according to an embodiment of the present invention.

FIG. 6 illustrates a method of decoding an image, according to an embodiment of the present invention.

Referring to FIG. 6, the image decoding method may include operations sequentially processed, for example, in the time domain by an image decoding apparatus, such as the image decoding apparatus illustrated in FIG. 5. Thus, even if omitted, operations corresponding to aspects of the image decoding apparatus illustrated in FIG. 5 may also be implemented in the image decoding method, according to differing embodiments of the present invention.

In operation 600, a received bitstream is entropy-decoded, and then, in operation 620, the image decoding apparatus restores a residue of each of image components corresponding to a difference between a predicted image and a current image, which include at least two image components, by dequantizing and detransforming the result entropy-decoded in operation 600 on predetermined-sized block basis.

In operation 640, the current image may be restored by adding a predicted image, generated by applying the same encoding mode to the residue of each of the image components restored in operation 620, to the restored residue.

In general, in order to generate a bitstream by compressing data in an entropy encoding process, the data to be compressed is processed by partitioning the data into predetermined meaningful units. The predetermined meaningful units are called syntax elements. A unit of syntax element for arithmetic coding/decoding the transformed and quantized residues, generated by referring to FIGS. 10A-10B and 11A-11B, and a detailed process of encoding/decoding the syntax element, are discussed in greater detail with reference to FIGS. 12A, 12B, and 12C.

Figure 12A:
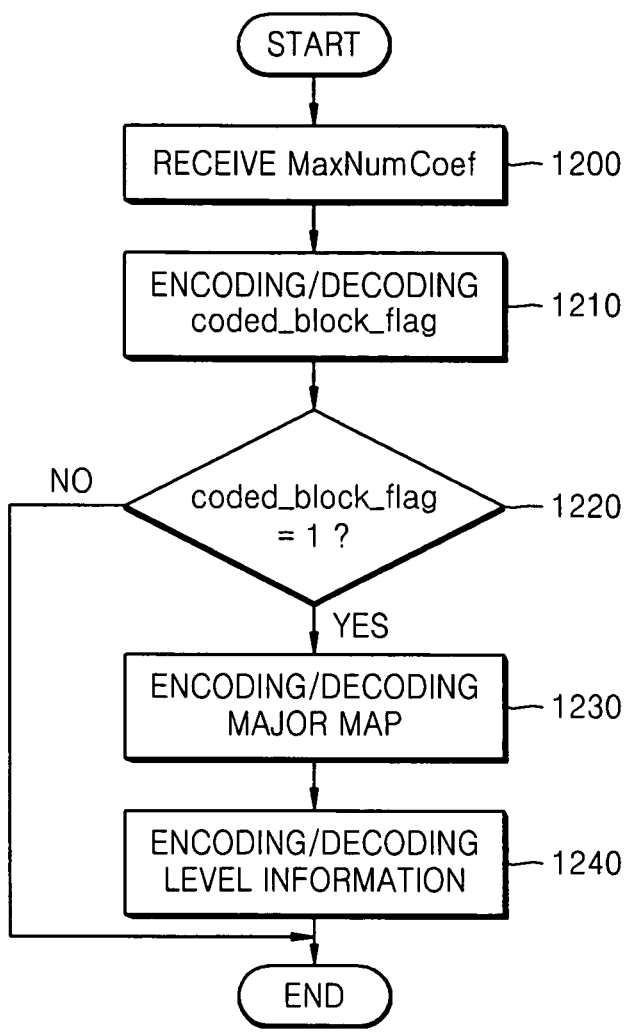
FIGS. 12A, 12B, and 12C illustrate a method of encoding/decoding quantized transform coefficients of a residue, according to an embodiment of the present invention.
Figure 12B:
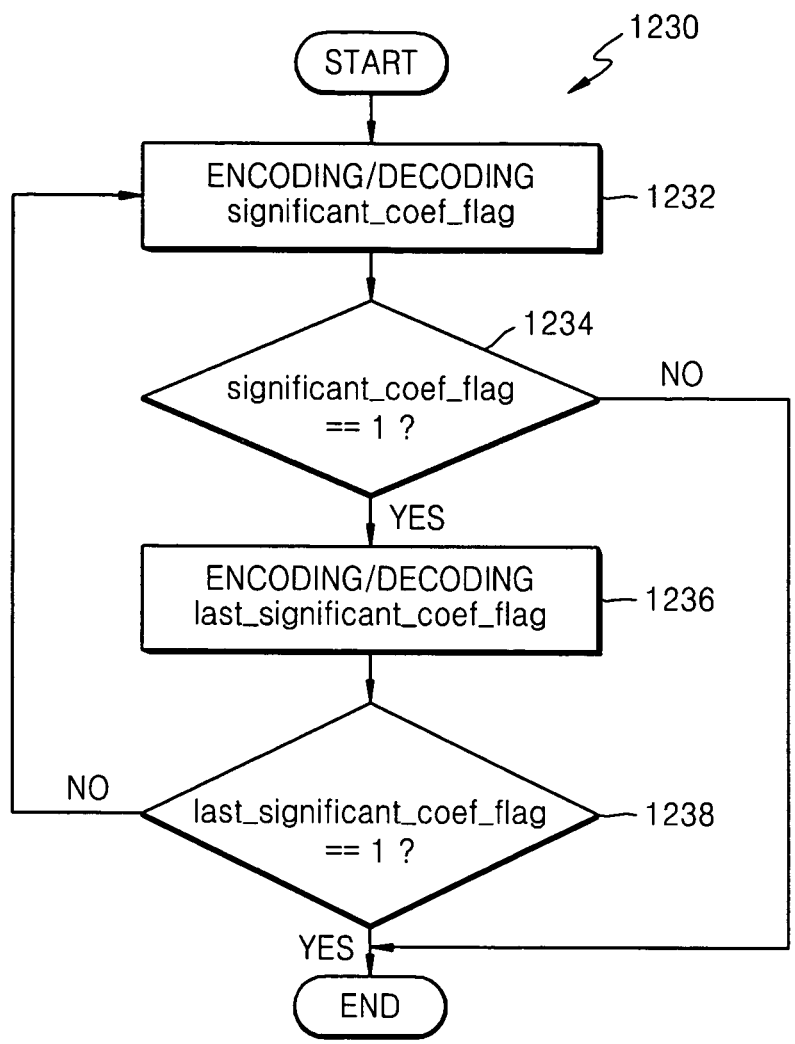
Figure 12C:
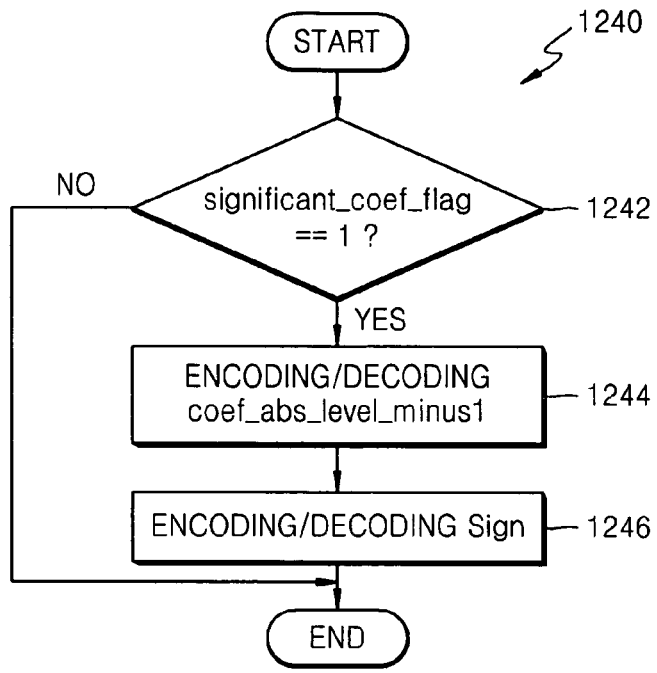

Here, FIGS. 12A, 12B, and 12C illustrate a method of encoding/decoding quantized transform coefficients of a residue, according to an embodiment of the present invention.

Referring to FIG. 12A, in operation 1200, syntax element MaxNumCoeff, indicating the number of coefficients of the residue restored by the transformation/quantization unit 320, for example, may be received. Here, if the transformation/quantization unit 320 performs the transformation/quantization on 4×4 block basis, MaxNumCoeff becomes 16. If the spatial prediction is performed on 16×16 block basis in the I16×16 encoding mode, MaxNumCoeff becomes 16 for the DC coefficient and 15 for Alternative Current (AC) coefficient. If the transformation/quantization unit 320 illustrated in FIG. 3 performs the transformation on 8×8 block basis, MaxNumCoeff becomes 64.

In operation 1210, the image encoding apparatus may encode/decode syntax element coded_block_flag, indicating whether the residue restored by the transformation/quantization unit 320, for example, is 0 based on a transform block size. In general, a residue is transformed based on a transform block size of 4×4 or 8×8. In H.264/AVC, coded_block_flag is encoded based on the transform block size of 4×4, and whether all coefficients of a quantized residue of a transform block of 8×8 are 0 is indicated using coded_block_pattern, which is another syntax element. Thus, when transformation based on the transform block size of 8×8 is used, coded_block_pattern and coded_block_flag overlap each other, and thus coded_block_flag is not separately encoded.

In operation 1220, whether coded_block_flag is 1 is determined. If it is determined that coded_block_flag is 1, the process proceeds to operation 1230, and if coded_block_flag is not 1, the process may end. The fact that coded_block_flag is 1 indicates that non-zero coefficients exist in a 4×4 block corresponding to coded_block_flag.

In operation 1230, major map information is encoded/decoded, with the major map information indicating location information of the non-zero coefficients in the 4×4 block corresponding to coded_block_flag.

In operation 1240, level information of the non-zero coefficients is encoded/decoded.

FIG. 12B illustrates operation 1230 of FIG. 12A in greater detail.

Referring to FIG. 12B, in operation 1232, syntax element significant_coeff_flag, which is map information indicating whether a transformed and quantized residue in a 4×4 block corresponding to coded_block_flag is 0, is encoded/decoded.

In operation 1234, whether significant_coeff_flag is 1 is determined. If it is determined that significant_coeff_flag is 1, the process proceeds to operation 1236, and if significant_coeff_flag is not 1, the process may end. The fact that significant_coeff_flag=1 indicates that the transformed and quantized residue in the 4×4 block corresponding to coded_block_flag is not 0.

In operation 1236, syntax element last_significant_coeff_flag may be encoded/decoded, with the last_significant_coeff_flag indicating whether data, of the case where the transformed and quantized residue in the 4×4 block corresponding to coded_block_flag is not 0, is finally non-zero data when the data is one-dimensionally scanned in the 4×4 block, as illustrated in FIGS. 11A-11B, for example.

In operation 1238, whether last_significant_coeff_flag is 1 is determined. If last_significant_coeff_flag is 1, the process may end, and if last_significant_coeff_flag is not 1, the process may return to operation 1232. The fact that last_significant_coeff_flag is 1 indicates that the data is finally non-zero data when the data is one-dimensionally scanned in the 4×4 block.

FIG. 12C illustrates operation 1240 of FIG. 12A in greater detail.

Referring to FIG. 12C, in operation 1242, whether significant_coeff_flag is 1 may be determined. If significant_coeff_flag is 1, the process proceeds to operation 1244, and if significant_coeff_flag is not 1, the process may end. As described above, the fact significant_coeff_flag=1 indicates that the transformed and quantized residue in the 4×4 block corresponding to coded_block_flag is not 0.

In operation 1244, syntax element coeff_abs_level_minus1 is encoded/decoded, with coeff_abs_level_minus1 being a level value of non-zero data in the 4×4 block corresponding to coded_block_flag.

In operation 1246, a sign value of the level value of non-zero data in the 4×4 block corresponding to coded_block_flag may be encoded/decoded.

Figure 13:
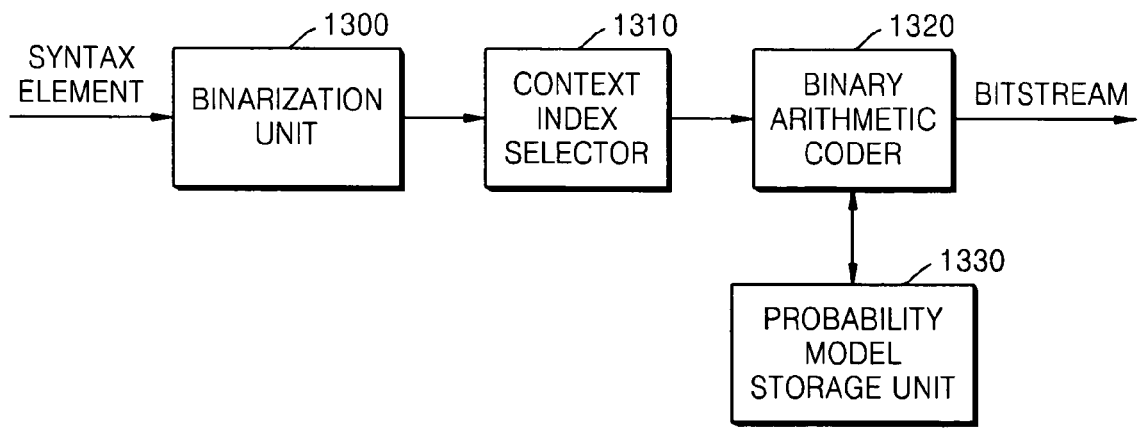
FIG. 13 illustrates a general context-based binary arithmetic coding apparatus.

FIG. 13 illustrates a general context-based binary arithmetic coding apparatus.

Such a context-based binary arithmetic coding apparatus includes a binarization unit 1300, a context index selector 1310, a probability model storage unit 1330, and a binary arithmetic coder 1320. In one embodiment, the syntax elements include basic units for compressing image information in the entropy encoder 330 illustrated in FIG. 3, and as a representative example, the syntax elements may include a Coded Block Pattern (CBP), a motion vector, and residue information.

When a syntax element is not a binary value comprised of 0 or 1, the binarization unit 1300 binarizes the syntax element. In particular, the binarization unit 1300 can increase encoding efficiency by granting a long-length binary value to a low probability symbol and a short-length binary value to a high probability symbol, as in Variable Length Coding (VLC). In MPEG-4 AVC/H.264, for this binarization method, unary code, truncated unary code, fixed-length code, and a combination of truncated unary code and exponential Golomb code are used, as examples.

The unary code is obtained by binarizing a level value x to 1 and 0 (the total number of 1s and 0s is x). The truncated unary code uses a portion of the unary code, and when a used range is fixed from 0 to S, 1 is finally used for the S value without using 0. The exponential Golomb code is constituted of a prefix and a suffix, the prefix being a unary code of a l(x) value calculated by the below Equation 3.

$$l(x) = \log_2(x/2^k + 1) \qquad \text{Equation 3}$$

Here, x denotes a value to be binarized, k denotes an order of an exponential code. The suffix of the exponential Golomb code is a binary code of a m(x) value calculated by the below Equation 4, the binary code having the number of bits, i.e., k+l(x).

$$m(x) = x + 2^k(1 - 2^{l(x)}) \qquad \text{Equation 4}$$

FIG. 25 illustrates a combination of a truncated unary code and an exponential Golomb code.

Here, FIG. 25 shows a case where abs_level_minus1, which is a value obtained by subtracting 1 from a quantized transform coefficient of the residue illustrated in FIG. 12, is binarized. As illustrated in FIG. 25, if it is assumed that bin denotes each of binarized values, in MPEG-4 AVC/H.264, if abs_level_minus1 is less than 14, abs_level_minus1 is mapped to a truncated unary (TU) code in which continuous 1's are followed by a 0 at the end. If abs_level_minus1 is equal to or greater than 14, a prefix portion corresponding to binary values less than 13 is mapped to the truncated unary code, and a suffix portion corresponding to binary values equal to or greater than 14 is mapped to the exponential Golomb code having an order of 0. As described above, different binarizing methods are used according to values in order to maximize the effect of arithmetic coding by adaptively granting a probability value to frequent small values.

The context index selector 1310 selects probability model information of the syntax element as "context based," which is a method of increasing compression efficiency by adaptively granting a probability value through extraction of a different context according to states of adjacent symbols when a provided binary symbol is encoded. That is, the probability model information includes two factors, a state and a Most Probability Symbol (MPS), adaptively changed according to selected context index information as described above, presenting information on a probability characteristic using the two factors. The two factors are stored in the probability model storage unit 1330.

The binary arithmetic coder 1320 searches a probability model of the syntax element using the context index information selected by the context index selector 1310 and encodes a binary value using the model information. The binary arithmetic coder 1320 also updates the probability model considering the encoded binary value after the encoding is performed.

Figure 14:
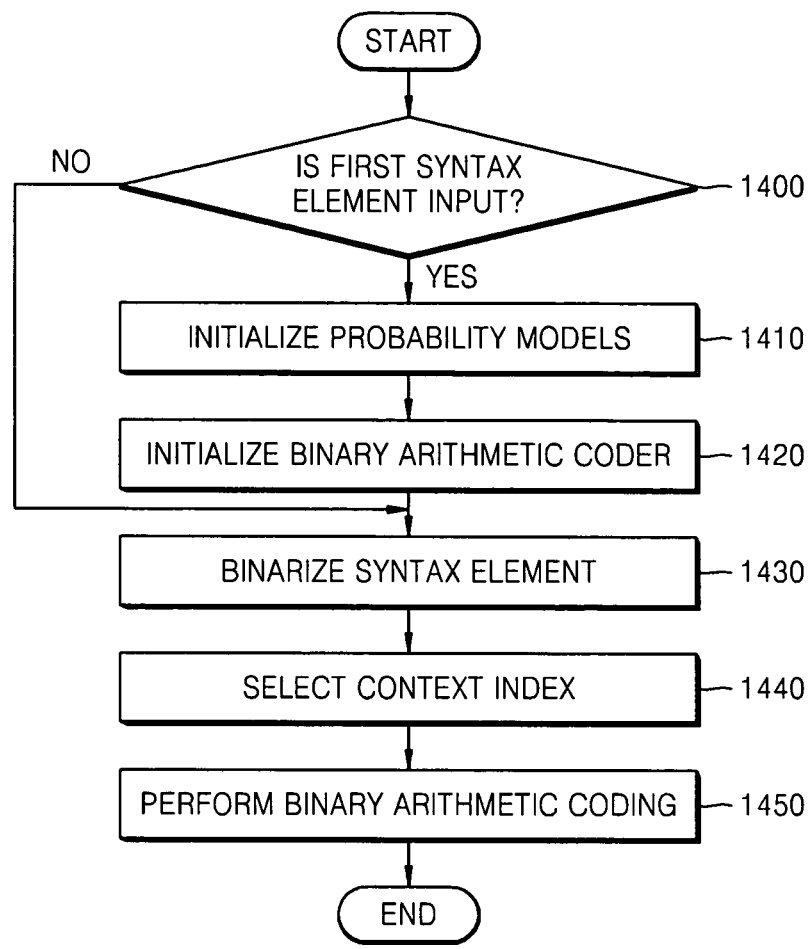
FIG. 14 illustrates a general context-based binary arithmetic coding method.

FIG. 14 illustrates a general context-based binary arithmetic coding method.

In operation 1400, whether an input syntax element is a first syntax element of a specified unit is determined. If it is determined that the input syntax element is the first syntax element, the process goes to operation 1410, and if the input syntax element is not the first syntax element, the process goes to operation 1430, thereby omitting initialization to be performed in operations 1410 and 1420. Here, the specified unit may be a "slice" or "picture".

In operation 1410, probability models of all syntax elements may be initialized.

In operation 1420, parameter values of the binary arithmetic coder 1320 may be initialized.

In operation 1430, the input syntax element may further be binarized.

In operation 1440, a context index of each of binary values, e.g., binarized in operation 1430, may be selected using adjacent context indexes. By doing this, a probability model can be more easily predicted, and thus the encoding efficiency can be increased.

In operation 1450, each of the binary values of the input syntax element may be binary-arithmetic coded using the probability model selected in operation 1440.

Figure 15:
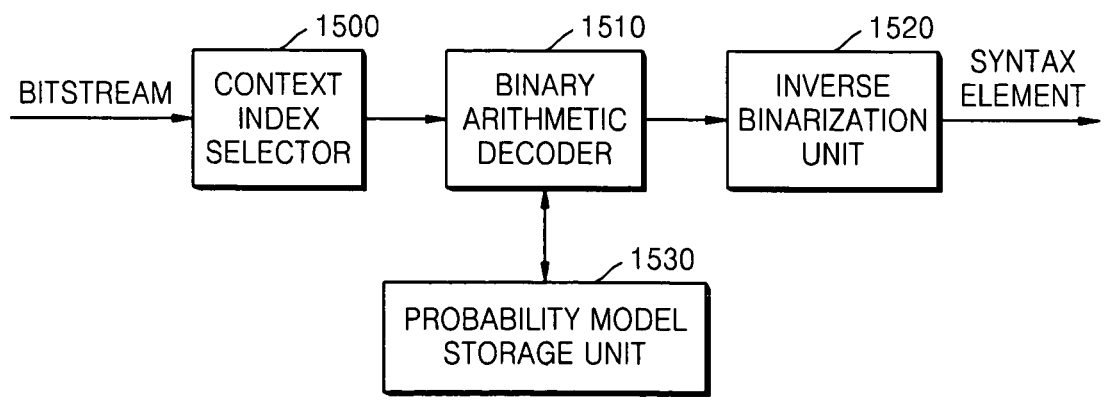
FIG. 15 illustrates a general context-based binary arithmetic decoding apparatus.

FIG. 15 illustrates a general context-based binary arithmetic decoding apparatus.

Referring to FIG. 15, the context-based binary arithmetic decoding apparatus may include a context index selector 1500, a probability model storage unit 1530, a binary arithmetic decoder 1510, and an inverse binarization unit 1520, for example. A process performed by the context-based binary arithmetic decoding apparatus may be an inverse process of the process performed by the context-based binary arithmetic coding apparatus illustrated in FIG. 13, for example, and may restore a syntax element from a bitstream.

Figure 16:
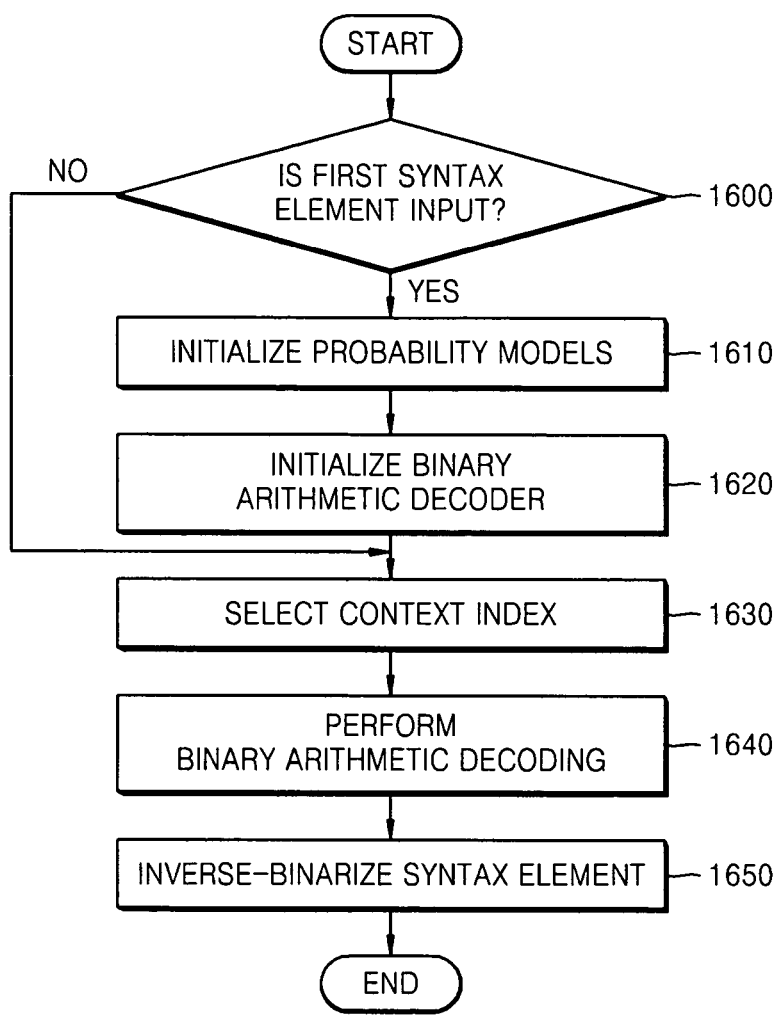
FIG. 16 illustrates a general context-based binary arithmetic decoding method.

FIG. 16 illustrates a general context-based binary arithmetic decoding method.

In operation 1600, whether an input bitstream is a bitstream for restoring a first syntax element of the specified unit may be determined. If the input bitstream is a bitstream for restoring the first syntax element, the process may proceed to operation 1610, and if the input bitstream is not a bitstream for restoring the first syntax element, the process may proceed to operation 1630, thereby omitting example initialization performed in operations 1610 and 1620.

In operation 1610, probability models of all syntax elements may be initialized.

In operation 1620, parameter values of the binary arithmetic decoder 1510, e.g., such as illustrated in FIG. 15, may be initialized.

In operation 1630, a context index of each of binary values of the syntax element may be selected using adjacent context indexes.

In operation 1640, the binary values of the syntax element may be restored by performing binary-arithmetic decoding on each of the binary values of the syntax element using the context index selected in operation 1630.

In operation 1650, the syntax element may be restored by inverse-binarizing the binary values restored in operation 1640.

Context-based binary arithmetic coding and decoding methods using a single probability model, according to an embodiment of the present invention, will now be described in greater detail by referring to the above description. In particular, a syntax element used by the context-based binary arithmetic coding apparatus illustrated in FIG. 17 and the context-based binary arithmetic decoding apparatus illustrated in FIG. 19 includes CBP (coded_block_pattern) information and encoding information of the residue transformed and quantized by the transformation/quantization unit 320 illustrated in FIG. 3.

Figure 17:
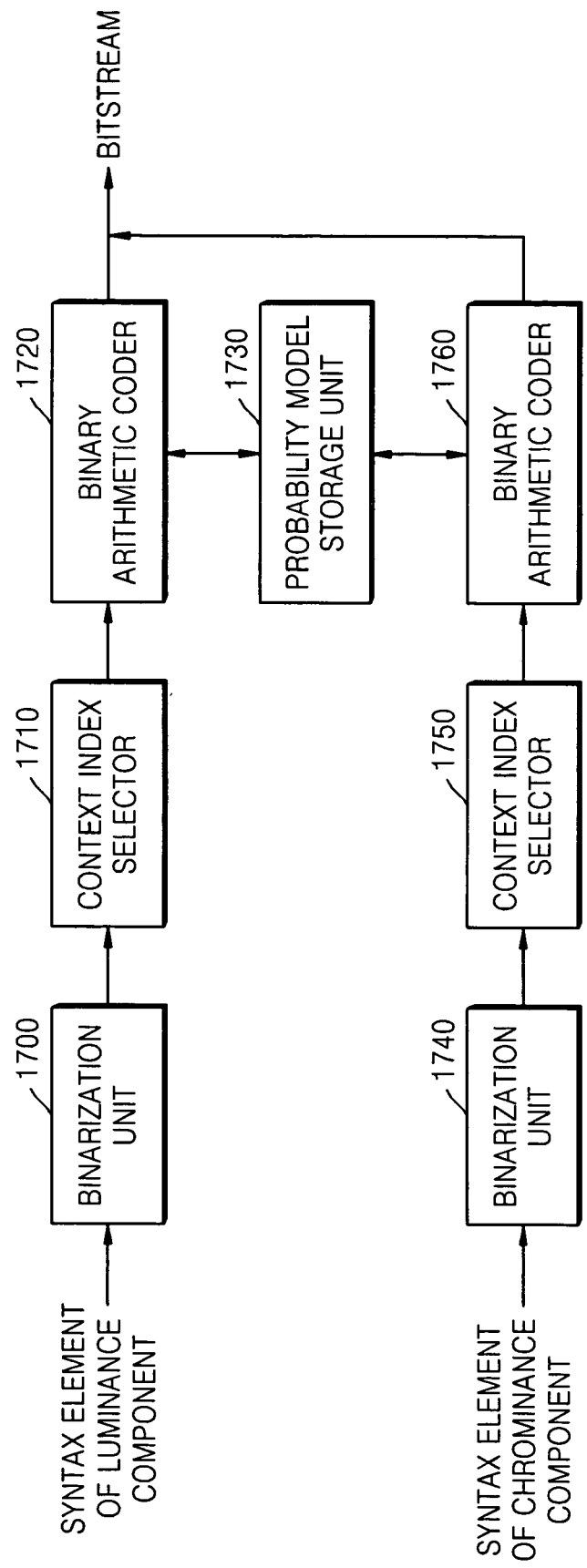
FIG. 17 illustrates a context-based binary arithmetic coding apparatus, according to an embodiment of the present invention.

FIG. 17 illustrates a context-based binary arithmetic coding apparatus, according to an embodiment of the present invention.

Referring to FIG. 17, the context-based binary arithmetic coding apparatus may include binarization units 1700 and 1740, context index selectors 1710 and 1750, and binary arithmetic coders 1720 and 1760 of syntax elements for a luminance component and a chrominance component, and a probability model storage unit 1730, for example. Here, the context-based binary arithmetic coding apparatus according to this embodiment is different from the context-based binary arithmetic coding apparatus illustrated in FIG. 13 in that the same probability model is used for a syntax element of the luminance component and a syntax element of the chrominance component. Since characteristics of image components are similar to each other in a 4:4:4 format image, it is advantageous to use the same probability model, and there is an advantage that complexity is reduced since an increase of unnecessary probability models is prevented.

Each of the binarization units 1700 and 1740 may binarize a syntax element for encoding a residue corresponding to a difference between a predicted image and a current image including at least two image components. In particular, the binarization unit 1700 may binarize a syntax element for encoding a residue of the luminance component, and the binarization unit 1740 may binarize a syntax element for encoding a residue of the chrominance component.

Each of the context index selectors 1710 and 1750 may select context index information of a binary value of the syntax element. In particular, in this embodiment, the context index selector 1710 selects context index information of a binary value of the syntax element for encoding the residue of the luminance component, and the context index selector 1760 selects context index information of a binary value of the syntax element for encoding the residue of the chrominance component.

Each of the binary arithmetic coders 1720 and 1760 may binary-arithmetic code the binary value of the syntax element using a probability model having the same syntax element probability value for the context index value of the image component selected by the corresponding context index selector 1710 or 1750. In particular, in this embodiment, the binary arithmetic coder 1720 binary-arithmetic codes the binary value of the syntax element using a probability model having the same syntax element probability value for the context index value of the residue of the luminance component selected by the context index selector 1710, and the binary arithmetic coder 1760 binary-arithmetic codes the binary value of the syntax element using a probability model having the same syntax element probability value for the context index value of the residue of the chrominance component selected by the context index selector 1750.

In particular, according to this embodiment, each of the binary arithmetic coders 1720 and 1760 binary-arithmetic codes CBP information, which is a kind of syntax element for encoding the residue of the corresponding image component, using the same probability model for the image components. The CBP information indicates whether residue data transformed and quantized per a predetermined-sized block is all 0 for each of the at least two image components.

In more detail, the binary arithmetic coders 1720 and 1760 respectively binary-arithmetic code a first component of interest and a second component of interest among the image components using the same probability model. That is, in this embodiment, the binary arithmetic coders 1720 and 1760 respectively binary-arithmetic code. CBP information indicating whether residue data transformed and quantized per predetermined-sized block is all 0 for the first component of interest among the image components and CBP information indicating whether residue data transformed and quantized per predetermined-sized block having the same phase is all 0 for the second component of interest among the image components, using the same probability model. For example, the first component of interest may be the luminance component, and the second component of interest may be a chrominance component. Alternatively, the binary arithmetic coders 1720 and 1760 respectively binary-arithmetic code CBP information indicating whether residue data transformed and quantized per predetermined-sized block having the same phase for the first component of interest is all 0, using the same probability model.

The probability model storage unit 1730 stores the probability model having the same syntax element probability value for the context index information of each of the at least two image components.

Figure 18:
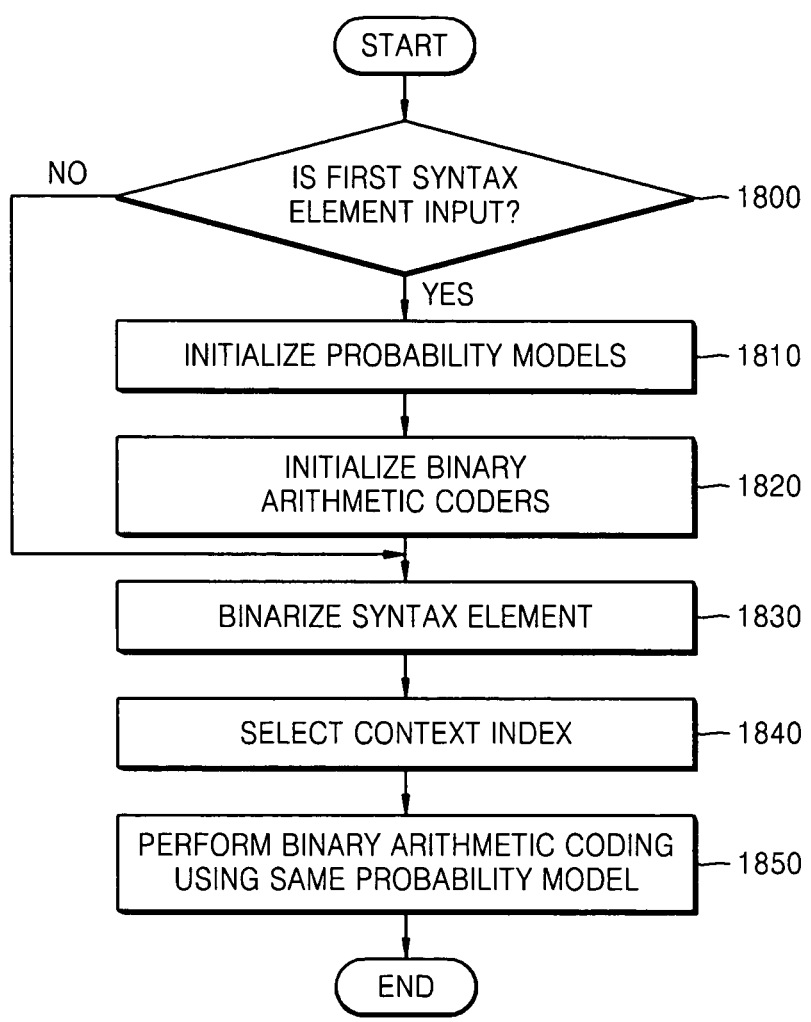
FIG. 18 illustrates a context-based binary arithmetic coding method, according to an embodiment of the present invention.

FIG. 18 illustrates a context-based binary arithmetic coding method, according to an embodiment of the present invention.

Referring to FIG. 18, the context-based binary arithmetic coding method includes operations sequentially processed, for example, in the time domain by the context-based binary arithmetic coding apparatus illustrated in FIG. 17. Thus, even if omitted, aspects of the context-based binary arithmetic coding apparatus illustrated in FIG. 17 may also be implemented in the context-based binary arithmetic coding method, according to differing embodiments.

In operation 1800, whether an input syntax element is a first syntax element of the specified unit may be determined.

If the input syntax element is the first syntax element, the may proceed to operation 1810, and if the input syntax element is not the first syntax element, the process may proceed to operation 1830, thereby omitting initializations to be performed in operations 1810 and 1820.

In operation 1810, probability models of all syntax elements may be initialized.

In operation 1820, parameter values of the binary arithmetic coders 1720 and 1760 may be initialized.

In operation 1830, a syntax element of each of image components may be initialized.

In operation 1840, a context index of each of the binary values binarized in operation 1830 may be selected using adjacent context indexes.

In operation 1850, the binary values of the syntax elements may be binary-arithmetic coded, using the probability model having the same syntax element probability value for a context index value of each of the image components, which has been selected in operation 1440.

Figure 19:
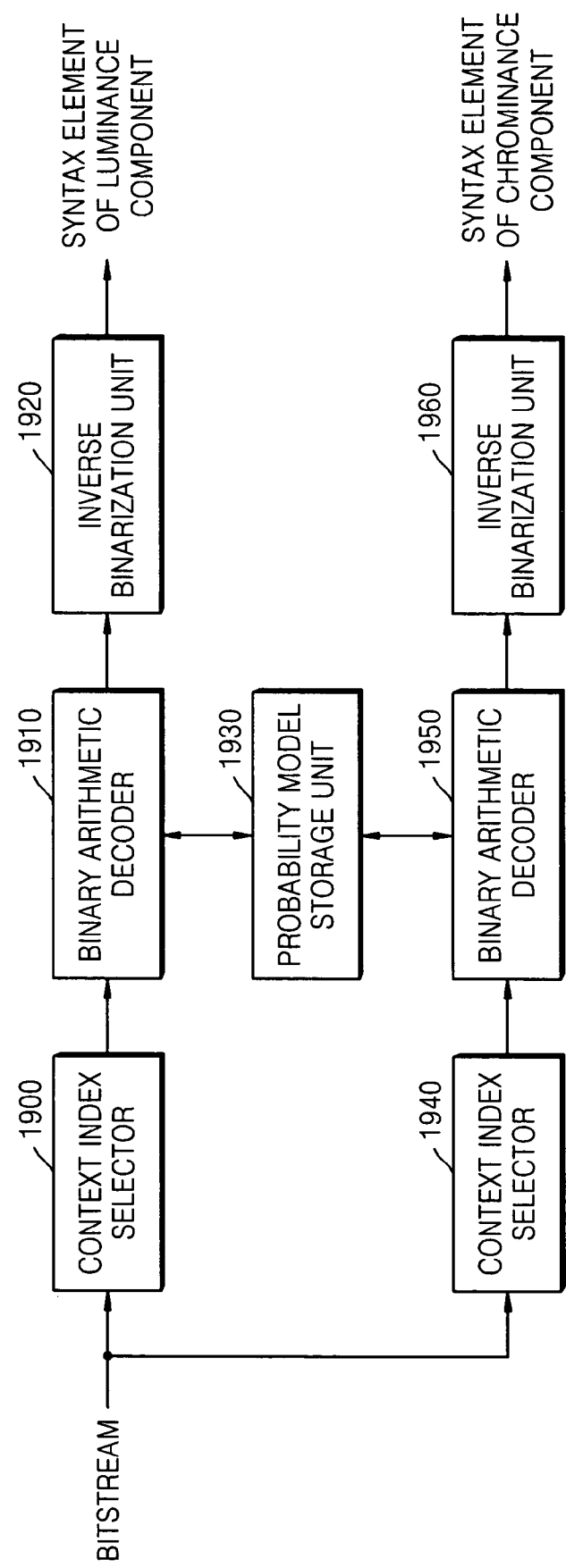
FIG. 19 illustrates a context-based binary arithmetic decoding apparatus, according to an embodiment of the present invention.

FIG. 19 illustrates a context-based binary arithmetic decoding apparatus, according to an embodiment of the present invention.

Referring to FIG. 19, the context-based binary arithmetic decoding apparatus may include context index selectors 1900 and 1940, binary arithmetic decoders 1910 and 1950, inverse binarization unit 1920 and 1960 for a luminance component and a chrominance component, and a probability model storage unit 1930, for example. The context-based binary arithmetic decoding apparatus, according to this embodiment, is different from the context-based binary arithmetic decoding apparatus illustrated in FIG. 15 in that the same probability model is used for a syntax element of the luminance component and a syntax element of a chrominance component.

Each of the context index selectors 1900 and 1940 selects context index information of a binary value of a syntax element for encoding a residue corresponding to a difference between a predicted image and a current image comprised of at least two image components.

Each of the binary arithmetic decoders 1910 and 1950 restores the binary value of the syntax element by performing binary-arithmetic decoding on the binary value of the syntax element using a probability model having the same syntax element probability value for the context index information of the image component selected by the corresponding context index selector 1900 or 1940. In particular, according to this embodiment, each of the binary arithmetic decoders 1910 and 1950 may perform binary-arithmetic decoding on CBP information, which is a kind of syntax element for decoding the residue of the corresponding image component, using the same probability model for the image components. The CBP information indicates whether residue data transformed and quantized per a predetermined-sized block is all 0's for each of the image components.

In more detail, the binary arithmetic decoders 1910 and 1950 respectively perform binary-arithmetic decoding on a first component of interest and a second component of interest among the image components using the same probability model. For example, the binary arithmetic decoders 1910 and 1950 respectively binary-arithmetic decode CBP information indicating whether residue data transformed and quantized per predetermined-sized block is all 0's for the first component of interest among the image components and CBP information indicating whether residue data transformed and quantized per predetermined-sized block having the same phase is all 0's for the second component of interest among the image components, using the same probability model.

Alternatively, the binary arithmetic decoders 1910 and 1950 may respectively binary-arithmetic decode CBP information indicating whether residue data transformed and quantized per predetermined-sized block having the same phase for each of the image components is all 0's, using the same probability model, for example.

The inverse binarization units 1920 and 1960 restore the syntax elements by inverse-binarizing the binary values of the syntax elements restored by the binary arithmetic decoders 1910 and 1950.

The probability model storage unit 1930 stores the probability model having the same syntax element probability value for the context index information of each of the at least two residue components.

Figure 20:
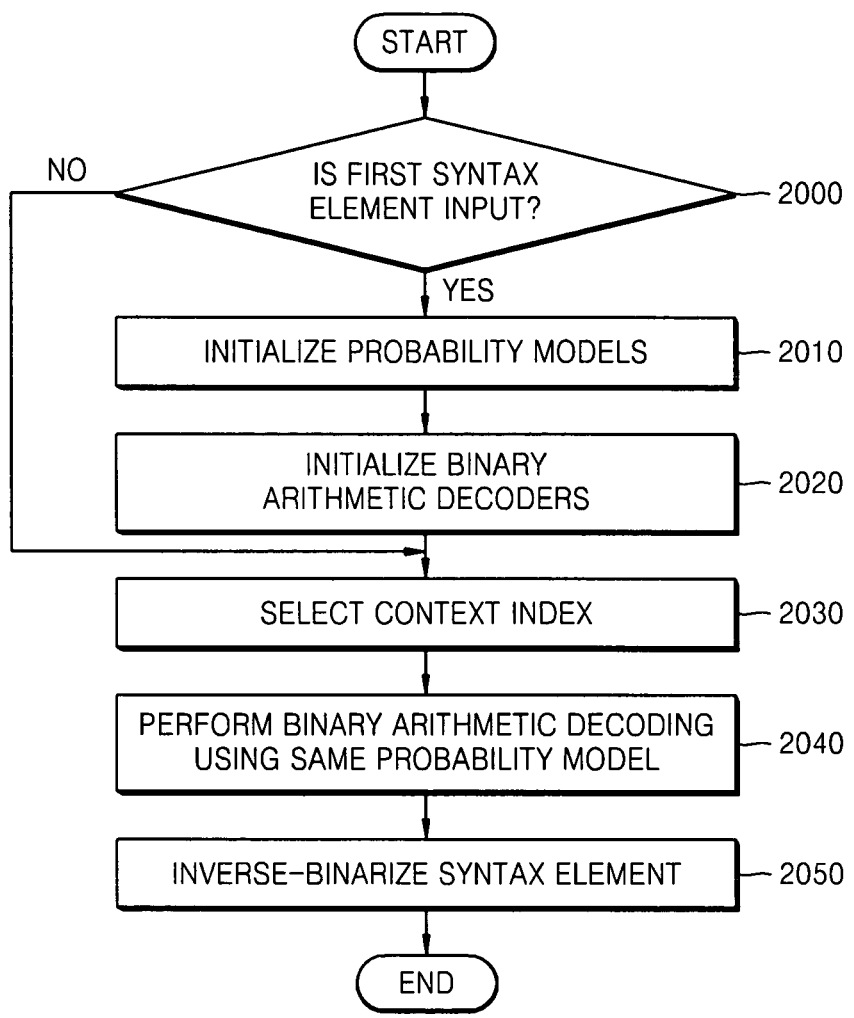
FIG. 20 illustrates a context-based binary arithmetic decoding method, according to an embodiment of the present invention.

FIG. 20 illustrates a context-based binary arithmetic decoding method, according to an embodiment of the present invention.

Referring to FIG. 20, the context-based binary arithmetic decoding method includes operations sequentially processed, for example, in the time domain by the context-based binary arithmetic decoding apparatus illustrated in FIG. 19. Thus, even if omitted, aspects of the context-based binary arithmetic decoding apparatus illustrated in FIG. 19 may also be implemented in the context-based binary arithmetic decoding method, according to differing embodiments.

In operation 2000, whether an input bitstream is a bitstream for restoring a first syntax element of the specified unit may be determined. If it is determined that the input bitstream is a bitstream for restoring the first syntax element, the process may proceed to operation 2010, and if the input bitstream is not a bitstream for restoring the first syntax element, the process may proceed to operation 2030 by omitting initializations performed in operations 2010 and 2020.

In operation 2010, probability models of all syntax elements may be initialized.

In operation 2020, parameter values of the binary arithmetic decoders 1910 and 1950 illustrated in FIG. 19 may be initialized.

In operation 2030, a context index of a binary value of a syntax element each of image components may be selected using adjacent context indexes.

In operation 2040, the binary values of the syntax elements may be restored by performing binary-arithmetic decoding on the binary values of the syntax elements, using the probability model having the same syntax element probability value for context index information of each of the image components, which has been selected in operation 2030.

In operation 2050, the syntax elements may be restored by inverse-binarizing the binary values restored in operation 2040.

FIG. 26 illustrates syntax elements, related to CBP information and encoding information of transformed/quantized residue data, desirable for restoring image components, including context index increase (ctxIdxInc) range information of the syntax elements, maxBinIdx of each of the syntax elements, and context index offset (ctxIdxOffset) information of the syntax elements. In FIG. 26, maxBinIdx indicates length information of a binary value obtained when a syntax element is binarized, the context index offset (ctxIdxOffset) information indicates a starting value of context index information of a syntax element, and the context index increase (ctxIdxInc) range information indicates a variation of context indexes (ctxIdx) which a syntax element can have using adjacent context index information. For coded_block_pattern, which is a syntax element of CBP, context index information of a luminance component may have values of 73 through 76.

However, since coded_block_pattern has different meanings for a luminance component and a chrominance component in a conventional 4:2:0 image, context index information of the chrominance component may have values of 77 through 84. However, in a 4:4:4 image encoding method using the single prediction mode, context index information of the chrominance component may have values of 73 through 76, and thus the same probability model is used for the luminance component and the chrominance component. Context index information (ctxIdx) of a binary value of the syntax element coded_block_pattern, which is selected by any of the context index selectors 1710, 1750, 1900, and 1940 illustrated in FIGS. 17 and 19, can be obtained by the following Equation 5, for example.

$$ctxIdx = cxtIdxOffset + ctxIdxInc \qquad \text{Equation 5}$$

Figure 24:
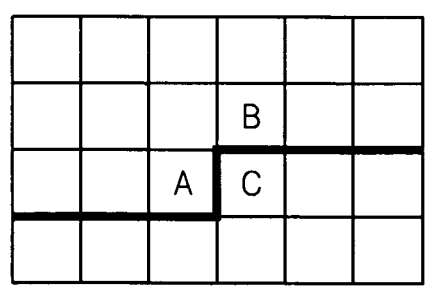
FIG. 24 illustrates two spatially adjacent blocks used to obtain context index information of block data, according to an embodiment of the present invention.

Here, in general, ctxIdxInc may be obtained using context index information obtained from spatially adjacent blocks in up and left directions in order to obtain context index information of a current block as illustrated in FIG. 24. The syntax element coded_block_pattern will be described in greater detail later.

As illustrated in FIG. 13, a probability model may include two factors, a state and a Most Probability Symbol (MPS), adaptively varying according to context index information, and in MPEG-4 AVC/H.264, the two factors are represented using m and n as illustrated in the below Equation 6.

$$\begin{aligned}
&\text{preCtxState} = \max(1, \min(126, ((m^* \text{sliceQP})) >> 4) + n)) \\
&\text{if (preCtxState} <= 63) \ \{ \\
&\quad \text{State} = 63 - \text{preCtxState} \\
&\quad \text{valMPS} = 0 \\
&\} \text{ else } \{ \\
&\quad \text{State} = \text{preCtxState} \ 64 \\
&\quad \text{valMPS} = 1 \\
&\}
\end{aligned} \qquad \text{Equation 6}$$

Here, an initial state value is determined by sliceQP, which is a QP value of a slice, m, and n and has a range of [0, 63]. If a state value is close to 0, a probability of an MPS of a binary value of a syntax element is close to ½, and if the state value is close to 63, the probability is close to 1. As an example, values of m and n indicating the same probability model used for syntax elements coded_block_pattern of luminance and chrominance components, which may be stored in the probability model storage units 1730 and 1930 illustrated in FIGS. 13 and 19, are illustrated in FIG. 27.

A method of selecting context index information in the context index selectors 1710, 1750, 1900, and 1940 illustrated in FIGS. 17 and 19 for a syntax element of a transformed and quantized residue according to an embodiment of the present invention will now be described in greater detail.

For syntax elements coded_block_flag, significant_coeff_flag, last_significant_coeff_flag, and coeff_abs_level_minus1, instead of coded_block_pattern using Equation 5 or another method of obtaining context index information of a syntax element, context index information may be obtained by the below Equation 7, for example.

$$ctxIdx = ctxIdxOffset + ctxBlockCatOffset(ctxBlockCat) + ctxIdxInc \qquad \text{Equation 7}$$

Here, ctxBlockCat is a value to differently use context index information for each of block types, e.g., according to the encoding modes illustrated in FIG. 1 and the transform methods illustrated in FIGS. 10A and 10B, and is illustrated in FIG. 28.

The item ctxBlockCatOffset(ctxBlockCat) of Equation 7 indicates a starting value of context index information corresponding to each block type when ctxBlockCat is defined, and is illustrated in FIG. 29.

For syntax elements coded_block_flag, significant_coeff_flag, last_significant_coeff_flag, and coeff_abs_level_minus1, which are syntax elements of image components, as illustrated in FIG. 28, ctxBlockCat information of luminance and chrominance components is different from each other in a 4:2:0 image. That is, as illustrated in Equation 7, context index information (ctxIdx) of the luminance and chrominance components is different from each other, and thus probability models used for the luminance and chrominance components are different from each other. For a 4:4:4 image, ctxBlockCat information of luminance and chrominance components is the same for each encoding mode, and thus the same probability model is used.

Among syntax elements for encoding a residue, coeff_abs_level_minus1 will now be described in greater detail. If a value to be currently encoded is a binary number at a first location of binarized data, ctxIdxInc may be selected by the below Equation 8, for example.

$$\text{ctxIdxInc} = ((\text{numDecodAbsLevelGt1} != 0)?0:\text{Min}(N, 1 + \text{numDecodAbsLevelEq1})) \quad \text{Equation 8}$$

Here, ctxIdxInc denotes a value designating a selected context index, numDecodAbsLevelGt1 denotes the number of quantization transform coefficient values previously decoded greater than 1, numDecodAbsLevelEq1 denotes the number of quantization transform coefficient values previously decoded equal to 1, N denotes the number of context index values for the binary number at the first location, "!=" denotes "not equal", "?" denotes "if ~ then", ":" denotes "else". If the value to be currently encoded is not the binary number at the first location, ctxIdxInc may be selected by the below Equation 9, for example.

$$\text{ctxIdxInc} = N + \text{Min}(M, \text{numDecodAbsLevelGt1}) \quad \text{Equation 9}$$

Here, M denotes the number of context index values for binary numbers that are not placed at the first location. The context-based binary arithmetic coding apparatus, e.g., illustrated in FIG. 17, arithmetic-codes data output from the binarization unit 1700 or 1740 illustrated in FIG. 17, for example, using probability distribution of a context index value selected as described above. A method of arithmetic-coding data S1S2S3S4 for four symbols S1, S2, S3, and S4 respectively having probability values of 0.2, 0.4, 0.3, and 0.1 will now be described as only an example. Each range of the four symbols S1, S2, S3, and S4 is initialized to a range between 0 and 1 according to the probability distribution. That is, the ranges of the four symbols S1, S2, S3, and S4 may be respectively initialized to ranges of [0.0, 0.2], [0.2, 0.6], [0.6, 0.9], and [0.9, 1.0]. An entire range is determined to [0.0, 0.2] that is the range initialized for the first symbol S1, and thus a range of the second symbol S3 in the newly determined range [0.0, 0.2] is [0.12, 0.18]. A range of the third symbol S2 in the new range [0.12, 0.18] is [0.132, 0.156], and a range of the last symbol S4 in the new range [0.132, 0.156] is [0.1536, 0.156]. Thus, the data S1S2S3S4 can be encoded to an arbitrary value belonging to the finally determined range [0.1536, 0.156]. For example, the binary arithmetic coder 1320 illustrated in FIG. 13 can encode the data S1S2S3S4 to 0.154 belonging to the range [0.1536, 0.156].

Figure 21A:
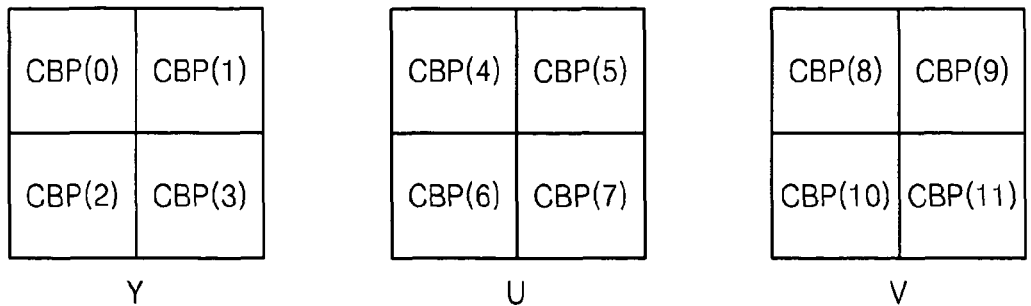
FIGS. 21A-21B illustrate a Coded Block Pattern (CBP) encoding/decoding method for efficiently encoding/decoding residue data of a 4:4:4 image, according to an embodiment of the present invention.
Figure 21B:
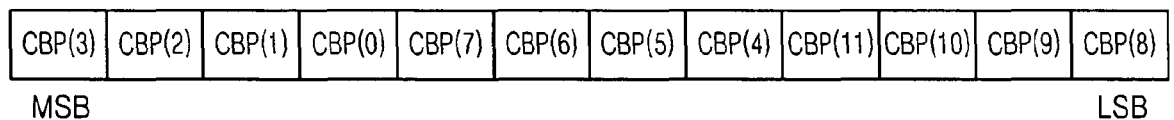

FIGS. 21A-21B illustrate a CBP encoding/decoding method for efficiently encoding/decoding residue data of a 4:4:4 image, according to an embodiment of the present invention.

In FIG. 21A, CBP(0) through CBP(3) denote CBP information of blocks of interest of a luminance component Y, CBP(4) through CBP(7) denote CBP information of blocks of interest of a chrominance component U (or Cb), and CBP(8) through CBP(11) denote CBP information of blocks of interest of a chrominance component V (or Cr). FIG. 21B shows a binarized result of code_block_pattern, which is a syntax element of a macroblock of the 4:4:4 image illustrated in FIG. 21A. As a result, a binarized value of code_block_pattern may be constituted of 12 bits and may have a value between 0 and 4095, for example.

The syntax element code_block_pattern may contain all of CBP information of the luminance and chrominance components and can be represented by the below Equation 10, for example.

$$\text{CodedBlockPatternLuma} = \text{coded\_block\_pattern} \% 16;$$

$$\text{CodedBlockPatternChroma} = \text{coded\_block\_pattern}/16;$$

$$\text{CodedBlockPatternLuma} = \text{CBP}(3) << 3 + \text{CBP}(2) << 2 + \text{CBP}(1) << 1 + \text{CBP}(0);$$

$$\text{CodedBlockPatternChroma} = \text{CodedBlockPatternChroma444}[0] << 4 + \text{CodedBlockPatternChroma444}[1];$$

$$\text{CodedBlockPatternChroma444}[0] = \text{CBP}(7) << 3 + \text{CBP}(6) << 2 + \text{CBP}(5) << 1 + \text{CBP}(4)$$

$$\text{CodedBlockPatternChroma444}[1] = \text{CBP}(11) << 3 + \text{CBP}(10) << 2 + \text{CBP}(9) << 1 + \text{CBP}(8)$$

$$\text{CodedBlockPatternChroma444}[iCbCr](iCbCr == 0, \text{or } 1) \quad \text{Equation 10}$$

Here, according to this embodiment, CodedBlockPatternLuma contains CBP information of the luminance component, CodedBlockPatternChroma contains CBP information of the chrominance component, and CodedBlockPatternChroma includes CodedBlockPatternChroma444[iCbCr] (the U component if iCbCr==0, the V component if iCbCr==1), which is CBP information of the chrominance component U (or Cb) or V (or Cr).

For the encoding modes excluding the I16×16 encoding mode, a detailed meaning of CBP information of the syntax element code_block_pattern for a luminance component of each predetermined-sized block, according to an embodiment of the present invention, is illustrated in FIG. 30. For the I16×16 encoding mode, the detailed meaning of CodedBlockPatternLuma of a macroblock of a luminance component is illustrated in FIG. 31. In the case of the I16×16 encoding mode, CodedBlockPatternLuma indicates information for determining whether transform coefficients of all blocks in the macroblock instead of a block basis are 0, by indicating code_block_pattern of a portion of an image in which a variation of pixels is not serious.

For the encoding modes excluding the I16×16 encoding mode in a 4:4:4 image, a detailed meaning of CBP information, according to an embodiment of the present invention, of the syntax element code_block_pattern for a chrominance component of each predetermined-sized block is illustrated in FIG. 32. For the I16×16 encoding mode, the detailed meaning of CodedBlockPatternChroma of a macroblock of a chrominance component is illustrated in FIG. 33. In the case of the I16×16 encoding mode, CodedBlockPatternChroma indicates information for determining whether transform coefficients of all blocks in the macroblock instead of a block basis are 0, by indicating code_block_pattern of a portion of an image in which a variation of pixels is not serious. The CBP of the chrominance component illustrated in FIGS. 32 and 33 may have the same meaning as the CBP of the luminance component illustrated in FIGS. 30 and 31 due to a characteristic of the present invention, for example.

Figure 22A:
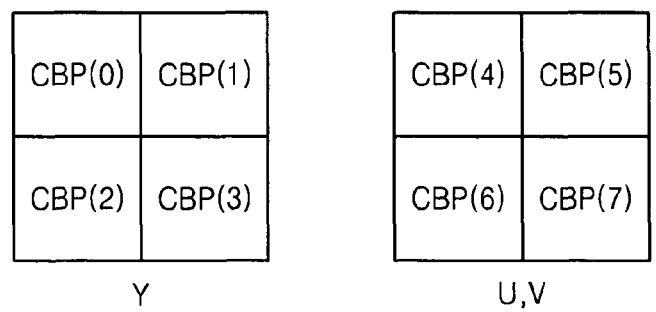
FIGS. 22A-22B illustrate a CBP encoding/decoding method for efficiently encoding/decoding residue data of a 4:4:4 image, according to another embodiment of the present invention.
Figure 22B:
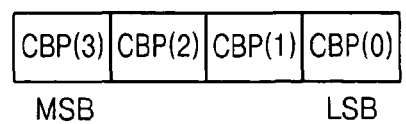

FIGS. 22A-22B illustrate a CBP encoding/decoding method for efficiently encoding/decoding residue data of a 4:4:4 image, according to another embodiment of the present invention.

In FIG. 22A, CBP(0) through CBP(3) denote CBP information of blocks of interest of a luminance component Y, which is the first component of interest, and CBP(4) through CBP(7) denote CBP information of a predetermined-sized block having the same phase between chrominance components U (or Cb) and V (or Cr), which are the second components of interest. FIG. 22B shows a binarized result of code_block_pattern, which is a syntax element of a macroblock of the 4:4:4 image illustrated in FIG. 22A. As a result, a binarized value of code_block_pattern may be constituted of 8 bits and can have a value between 0 and 255, for example.

The syntax element code_block_pattern may contain all of CBP information of the luminance and chrominance components and can be represented by the following Equation 11, for example.

CodedBlockPatternLuma=coded_block_pattern % 16;

CodedBlockPatternChroma=coded_block_pattern/16;

CodedBlockPatternLuma=CBP(3)<<3+CBP(2)<<2+ CBP(1)<<1+CBP(0);

CodedBlockPatternChroma=CBP(7)<<3+CBP(6)<< 2+CBP(5)<<1+CBP(4);   Equation 11

Here, CodedBlockPatternLuma contains CBP information of the luminance component, CodedBlockPatternChroma contains CBP information of the chrominance component.

For the encoding modes excluding the I16×16 encoding mode, the detailed meaning of CBP information of the syntax element code_block_pattern for a luminance component of each predetermined-sized block is illustrated in FIG. 30, as described in FIGS. 21A and 21B. For the I16×16 encoding mode, the detailed meaning of CodedBlockPatternLuma of a macroblock of a luminance component is illustrated in FIG. 31, as described in FIGS. 21A and 21B.

For the encoding modes excluding the I16×16 encoding mode in a 4:4:4 image, the detailed meaning of CBP information of the syntax element code_block_pattern for a chrominance component of each predetermined-sized block is illustrated in FIG. 34. For the I16×16 encoding mode, the detailed meaning of CodedBlockPatternChroma of a macroblock of a chrominance component is illustrated in FIG. 33, as described in FIGS. 21A-21B. The CBP of the chrominance component may have the same meaning as the CBP of the luminance component as a characteristic of the present invention.

Figure 23A:
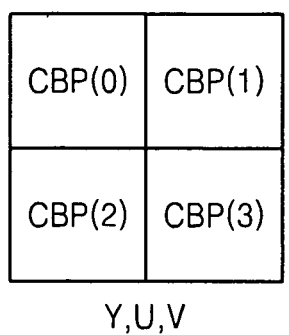
FIGS. 23A-23B illustrates a CBP encoding/decoding method for efficiently encoding/decoding residue data of a 4:4:4 image, according to another embodiment of the present invention.
Figure 23B:
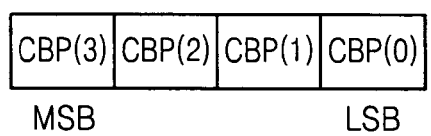

FIGS. 23A-23B illustrate a CBP encoding/decoding method for efficiently encoding/decoding residue data of a 4:4:4 image, according to another embodiment of the present invention.

In FIG. 23A, CBP(0) through CBP(3) denote CBP information of a predetermined-sized block having the same phase for each of all image components including a luminance component Y and chrominance components U (or Cb) and V (or Cr). FIG. 23B shows a binarized result of code_block_pattern, which is a syntax element of a macroblock of the 4:4:4 image illustrated in FIG. 23A. As a result, a binarized value of code_block_pattern may be constituted of 4 bits and can have a value between 0 and 15, for example.

The syntax element code_block_pattern contains all of CBP information of the luminance and chrominance components and can be represented by the below Equation 12, for example.

CodedBlockPatternLuma=coded_block_pattern;

CodedBlockPatternLuma=CBP(3)<<3+CBP(2)<<2+ CBP(1)<<1+CBP(0);   Equation 12

Here, CodedBlockPatternLuma contains CBP information of the same phase of the luminance and chrominance components.

For the encoding modes excluding the I16×16 encoding mode, the detailed meaning of CBP information of the syntax element code_block_pattern for luminance and chrominance components of each predetermined-sized block is illustrated in FIG. 35. For the I16×16 encoding mode, the detailed meaning of CodedBlockPatternLuma of a macroblock of the luminance and chrominance components is illustrated in FIG. 36.

FIG. 24 illustrates two spatially adjacent blocks used to obtain context index information of block data. In general, encoding efficiency is increased using context index information obtained from spatially adjacent blocks in up and left directions in order to obtain context index information of a current block In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to embodiments of the present invention. The media may also be a distributed network, so that the computer readable code is stored/transferred and executed in a distributed fashion. Still further, as only a example, the processing element could include a processor or a computer processor, and processing elements may be distributed and/or included in a single device.

As described above, according to an embodiment of the present invention, when prediction encoding of each component of a color image is performed, using spatially or temporally adjacent pixels, encoding efficiency can be increased by applying the same prediction method to each image component. For example, in the case where each component has the same resolution when, a YUV (or YCbCr) color image is used, encoding efficiency can be increased by using the same prediction method as the Y component without sampling chrominance components U (or Cb) and V (or Cr) by the conventional ¼ sampling In addition, according to an embodiment of the present invention, when an RGB color image is used, when a current RGB image is encoded in an RGB domain without being transformed to a YUV (or YCbCr) image, encoding efficiency can be increased with maintenance of high image quality by performing spatial prediction and temporal prediction of image components according to a statistical characteristic of the RGB image. In addition, by providing a context-based binary arithmetic coding method using a single probability model and a method of encoding CBP information on predetermined-sized block basis, in which entropy encoding/decoding is performed using a single probability model for image components with respect to a residue obtained using an encoding method, encoding efficiency can be increased without an increase in complexity.

In addition, by effectively compressing RGB video images, which can be directly acquired from a device, without transforming to YUV (or YCbCr) images, a loss of image quality, such as distortion of colors occurring with transforms to the YUV (or YCbCr) domain is performed, can be prevented due to the direct encoding in the RGB domain, and thus it is suitable to be applied to digital cinema and digital archive requiring high-quality image information.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of decoding a predicted image of a current image, the method comprising:
    obtaining a predicted direction of luma component of the current image;
    obtaining a predicted direction of chroma components corresponding to the predicted direction of luma component in one of predetermined decoding modes; and
    decoding the predicted image of the current image based on the predicted direction of the luma and chroma components,
    wherein the predicted direction of chroma components is identical to the predicted direction of the luma component.

2. A non-transitory computer readable medium comprising computer readable code to control at least one processing device to implement a method of decoding a predicted image of a current image, the method comprising:
    obtaining a predicted direction of luma component of the current image;
    obtaining a predicted direction of chroma components corresponding to the predicted direction of luma component in one of predetermined decoding modes; and
    decoding the predicted image of the current image based on the predicted direction of the luma and chroma components,
    wherein the predicted direction of chroma components is identical to the predicted direction of the luma component.

* * * * *